US 9,333,960 B2

(12) United States Patent
Kuki et al.

(10) Patent No.: US 9,333,960 B2
(45) Date of Patent: May 10, 2016

(54) VEHICLE BRAKING CONTROL DEVICE

(71) Applicants: ADVICS CO., LTD., Kariya (JP);
TOYOTA JIDOSHA KABUSHIKI KAISHA, Toyota-shi (JP)

(72) Inventors: Yosuke Kuki, Seto (JP); Yoshio Masuda, Kariya (JP); Hiroaki Niino, Toyota (JP); Kiyoyuki Uchida, Konan (JP); Masaaki Komazawa, Miyoshi (JP); Akira Sakai, Toyota (JP); Yasuji Mizutani, Toyota (JP); Yusuke Kamiya, Okazaki (JP)

(73) Assignees: ADVICS CO., LTD., Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 14/410,976

(22) PCT Filed: Jun. 25, 2013

(86) PCT No.: PCT/JP2013/067339
§ 371 (c)(1),
(2) Date: Dec. 23, 2014

(87) PCT Pub. No.: WO2014/002987
PCT Pub. Date: Jan. 3, 2014

(65) Prior Publication Data
US 2015/0203088 A1 Jul. 23, 2015

(30) Foreign Application Priority Data

Jun. 25, 2012 (JP) ................................. 2012-141957

(51) Int. Cl.
| | |
|---|---|
| B60T 15/02 | (2006.01) |
| B60T 8/40 | (2006.01) |
| B60T 13/14 | (2006.01) |
| B60T 7/04 | (2006.01) |
| B60T 13/66 | (2006.01) |
| B60T 13/68 | (2006.01) |

(52) U.S. Cl.
CPC ............... *B60T 15/028* (2013.01); *B60T 7/042* (2013.01); *B60T 8/4077* (2013.01); *B60T 13/145* (2013.01); *B60T 13/662* (2013.01); *B60T 13/686* (2013.01)

(58) Field of Classification Search
CPC ... B60T 15/025; B60T 15/028; B60T 13/145; B60T 13/146; B60T 8/363; B60T 8/3655
See application file for complete search history.

(56) References Cited

U.S. PATENT DOCUMENTS

| | | | | |
|---|---|---|---|---|
| 2009/0021072 A1* | 1/2009 | Kobayashi | .......... | B60T 8/17636 303/163 |
| 2009/0315391 A1* | 12/2009 | Tanaka | .................. | B60T 8/3655 303/113.5 |
| 2010/0314567 A1* | 12/2010 | Uechi | ...................... | B60T 8/36 251/129.15 |

FOREIGN PATENT DOCUMENTS

| | | |
|---|---|---|
| JP | 2004-237982 A | 8/2004 |
| JP | 2006-298313 A | 11/2006 |
| JP | 2011-156998 A | 8/2011 |
| JP | 2012-071681 A | 4/2012 |

OTHER PUBLICATIONS

International Search Report (PCT/ISA/210) mailed on Jul. 30, 2013, by the Japanese Patent Office as the International Searching Authority for International Application No. PCT/JP2013/067339.

\* cited by examiner

*Primary Examiner* — Vishal Sahni
(74) *Attorney, Agent, or Firm* — Buchanan Ingersoll & Rooney PC

(57) ABSTRACT

The vehicle braking control device adapted to a vehicle brake device having an electromagnetic valve which controls the brake fluid flow between the master cylinder and the wheel cylinders in response to the input electric energy. The vehicle braking control device includes a valve opening electric energy obtaining portion which obtains an input electric energy upon opening of the electromagnetic valve as a valve opening electric energy and an operation characteristic setting portion which sets an operation characteristic based on the valve opening electric energy obtained corresponding to the predetermined pressure differential. The opening valve electric energy obtaining portion changes the input electric energy at a valve closing side or a valve opening side with a change amount per unit of time larger than before valve opening in response to an obtaining of the valve opening electric energy.

5 Claims, 10 Drawing Sheets

Cylinder opening side ←——→ Cylinder bottom surface side

VEHICLE BRAKING CONTROL DEVICE

TECHNICAL FIELD

This invention relates to a vehicle braking control device which controls a vehicle brake device.

BACKGROUND ART

A vehicle braking control device has been known which includes a master cylinder for supplying wheel cylinders with a brake fluid, a conduit which connects the wheel cylinder and the master cylinders and an electromagnetic valve disposed in the conduit for generating a predetermined pressure differential between the master cylinder and the wheel cylinders. In such conventional braking control device for vehicles, the electromagnetic valve controls the flow of the brake fluid in response to the electric energy to be supplied thereto. Further, as a method for obtaining an operation characteristic (relationship between the valve opening current and the pressure differential) of the electromagnetic valve which constitutes the vehicle brake device, Patent document 1 (JP2004-237982 A) discloses such method. According to the disclosed method, by changing the amount of input electric energy to the electromagnetic valve, the input electric energy at the time the pressure in the conduit in which the electromagnetic valve is disposed is changed, is obtained (such input electric energy is hereinafter referred to as "valve opening electric energy") based on the obtained valve opening electric energy, the operation characteristic is set.

CITATION LIST

Patent Document

Patent Document 1: JP2004-237982 A

SUMMARY OF INVENTION

Technical Problems to be Solved by the Invention

However, according to the above conventional method, the input electric energy at the time of setting an operation characteristic of the electromagnetic valve is controlled by a smaller value than a control gain of the input electric energy when operated normally. For this reason, it is difficult to satisfy both improvements in accuracy of setting the operation characteristic of the electromagnetic valve and in shortening of time for setting of the operation characteristic thereof. In other words, if the value of control gain of the input electric energy is lessened to improve the accuracy of setting of the operation characteristic, the time for setting becomes long and if the value of control gain is raised to shorten the time of setting of the operation characteristic, the accuracy of setting is deteriorated.

Accordingly, this invention was made in consideration with the above-mentioned situation and the objective of the invention is to provide a braking control device which can satisfy both improvement of the accuracy of setting the operation characteristic of the electromagnetic valve and shortening of the time of setting the operation characteristic thereof.

Solutions to the Problem

The vehicle braking control device according to a first aspect of the invention is adapted to a vehicle brake device which includes an electromagnetic valve disposed between a master cylinder and a wheel cylinder for controlling brake fluid flow therebetween in response to an input electric energy. The vehicle braking control device includes a pressure differential control portion for generating a predetermined pressure differential between a master cylinder side and a wheel cylinder side with respect to the electromagnetic valve, a valve opening electric energy obtaining portion for obtaining the input electric energy upon opening of the electromagnetic valve as the valve opening electric energy, by changing the input electric energy towards an opening side of the electromagnetic valve with time, under the predetermined pressure differential being generated by the pressure differential control portion, after the input electric energy has been changed to close the electromagnetic valve and an operation characteristic setting portion for setting an operation characteristic which is a relationship between the input electric energy for the electromagnetic valve and the predetermined pressure differential between the master cylinder side and the wheel cylinder side of the electromagnetic valve based on a valve opening electric energy obtained by the valve opening electric energy obtaining portion corresponding to the predetermined pressure differential, wherein the valve opening electric energy obtaining portion changes the input electric energy at a valve closing side or a valve opening side of the electromagnetic valve with a change amount per unit of time larger than the change amount per unit of time before the time of opening of the electromagnetic valve upon obtaining of the valve opening electric energy.

The vehicle braking control device according to a second aspect of the invention is characterized in that in addition to the feature of the first aspect of the invention, the operation characteristic setting portion sets the operation characteristic of the electromagnetic valve based on a first valve opening electric energy which is the valve opening electric energy obtained by the valve opening electric energy obtaining portion corresponding to a predetermined first pressure differential generated by the pressure differential control portion and a second valve opening electric energy which is the valve opening electric energy obtained by the valve opening electric energy obtaining portion corresponding to a predetermined second pressure differential which is different from the first pressure differential generated by the pressure differential control portion and the valve opening electric energy obtaining portion obtains the input electric energy at the time of opening of the electromagnetic valve as the second valve opening electric energy by changing the input electric energy to the valve opening side with a relatively small change amount per unit of time after changing the input electric energy to the valve opening side for the electromagnetic valve with a relatively large change amount per unit of time to a predetermined value where the electromagnetic valve corresponding to the first valve opening electric energy is not opened upon obtaining the second valve opening electric energy of the same electromagnetic valve, after obtaining the first valve opening electric energy of the electromagnetic valve.

The vehicle braking control device according to a third aspect of the invention includes in addition to the feature of the first aspect of the invention, an auxiliary hydraulic pressure generating portion having an auxiliary cylinder connected to an auxiliary chamber which volume is variable in response to a displacement of a master piston of the master cylinder and an auxiliary piston slidable within the auxiliary cylinder in response to a change of volume of the auxiliary chamber thereby generating an auxiliary hydraulic pressure in the auxiliary chamber in response to a stroke position of the master piston. The valve opening electric energy obtaining portion judges that the electromagnetic valve has opened based on the auxiliary hydraulic pressure and changes the input electric energy towards the valve closing side of the electromagnetic valve in response to obtaining of the valve opening electric energies upon consecutively obtaining the valve opening electric energy of each of a plurality of the electromagnetic valves without returning the master piston to an initial position side thereof and the operation characteristic setting portion sets the operation characteristic based on a plurality of the valve opening electric energies obtained by the valve opening electric energy obtaining portion.

The vehicle braking control device according to a fourth aspect of the invention is characterized in that in addition to any one of the feature of the first, the second and third aspects of the invention, the vehicle braking control device is adapted to a vehicle brake device having a plurality of the electromagnetic valves provided at a corresponding plurality of the wheel cylinders, wherein the vehicle braking control device further includes an auxiliary hydraulic pressure generating portion having an auxiliary cylinder connected to an auxiliary chamber which volume is variable in response to a displacement of a master piston of the master cylinder and an auxiliary piston slidable within the auxiliary cylinder in response to a change of volume of the auxiliary chamber thereby generating an auxiliary hydraulic pressure in the auxiliary chamber in response to a stroke position of the master piston. The valve opening electric energy obtaining portion judges that the electromagnetic valve has opened based on the auxiliary hydraulic pressure and obtains a last valve opening electric energy of a last electromagnetic valve among the plurality of the electromagnetic valves provided at one of the plurality of wheel cylinders, where a relatively large amount of brake fluid with respect to the hydraulic pressure applied thereto flows, upon consecutively obtaining the valve opening electric energies of each of the plurality of the electromagnetic valves without returning the master piston to an initial position side thereof.

The vehicle braking control device according to a fifth aspect of the invention in addition to the fourth aspect of the invention above, further including an auxiliary hydraulic pressure generating portion having an auxiliary cylinder connected to an auxiliary chamber which volume is variable in response to a displacement of a master piston of the master cylinder and an auxiliary piston slidable within the auxiliary cylinder in response to a change of volume of the auxiliary chamber thereby generating an auxiliary hydraulic pressure in the auxiliary chamber in response to a stroke position of the master piston and the operation characteristic setting portion sets the operation characteristic of the electromagnetic valve based on a first valve opening electric energy which is the valve opening electric energy obtained by the valve opening electric energy obtaining portion corresponding to a predetermined first pressure differential generated by the pressure differential control portion and a second valve opening electric energy which is the valve opening electric energy obtained by the valve opening electric energy obtaining portion corresponding to a predetermined second pressure differential which is larger than the first pressure differential generated by the pressure differential control portion and the valve opening electric energy obtaining portion judges that the electromagnetic valve has opened based on the auxiliary hydraulic pressure and obtains the second valve opening electric energy last upon consecutively obtaining the plurality of valve opening electric energies without returning the master piston to an initial position side.

The vehicle braking control device according to a sixth aspect of the invention is characterized in that in addition to any one of the feature of the first, the second, the third, the fourth and the fifth aspects of the invention, the vehicle braking control device is adapted to a vehicle brake device having a plurality of electromagnetic valves provided at a corresponding plurality of the wheel cylinders, wherein the vehicle braking control device further includes an auxiliary hydraulic pressure generating portion having an auxiliary cylinder connected to an auxiliary chamber which volume is variable in response to a displacement of a master piston of the master cylinder and an auxiliary piston slidable within the auxiliary cylinder in response to a change of volume of the auxiliary chamber thereby generating an auxiliary hydraulic pressure in the auxiliary chamber in response to a stroke position of the master piston, wherein the operation characteristic setting portion sets the operation characteristic of the electromagnetic valve based on a first valve opening electric energy which is the valve opening electric energy obtained by the valve opening electric energy obtaining portion corresponding to a predetermined first pressure differential generated by the pressure differential control portion and a second valve opening electric energy which is the valve opening electric energy obtained by the valve opening electric energy obtaining portion corresponding to a predetermined second pressure differential which is larger than the first pressure differential generated by the pressure differential control portion and the valve opening electric energy obtaining portion judges that the electromagnetic valve has opened based on the auxiliary hydraulic pressure and obtains the first and the second valve opening electric energies of the plurality of the electromagnetic valves, a part of a subject of a valve opening electric energy consecutive obtaining process of one time is represented as the first valve opening electric energy and the remaining part of the subject of the same valve opening electric energy consecutive obtaining process at the one time is represented as the second valve opening electric energy upon obtaining the first and the second valve opening electric energies of the plurality of the electromagnetic valves by executing the valve opening electric energy consecutive obtaining process for a plurality of times without returning the master piston to an initial position side.

Advantageous Effects of Invention

According to the vehicle braking control device associated with the first aspect of the invention, upon obtaining the valve opening electric energy, the change amount of the input electric energy of the electromagnetic valve per unit of time is lessened before the opening of the electromagnetic valve. Accordingly, the setting accuracy of the operation characteristic of the electromagnetic valve can be enhanced. Further, with accompanying of obtaining the valve opening electric energy, the input electric energy at the valve closing side or the opening side of the electromagnetic valve is changed with a larger change amount per unit of time than the change amount before the opening of the electromagnetic valve. Accordingly, the time for setting the operation characteristic of the electromagnetic valve can be shortened. For example, when a plurality of valve opening electric energies is desired to be obtained consecutively, by instantly closing or opening the electromagnetic valve immediately after the obtaining of the valve opening electric energy, the pressure decreasing at the master cylinder side of the electromagnetic valve can be stabled in a short time period so that the next obtaining operation of the valve opening electric energy can be started or the consecutive obtaining process of the plurality of valve opening electric energies can be finished to start for a next process. Thus, according to the first aspect of the invention, both improvement of the accuracy of setting the operation characteristic of the electromagnetic valve and shortening of the time of setting the operation characteristic thereof can be satisfied.

According to the vehicle braking control device associated with the second aspect of the invention, upon obtaining the valve opening electric energies, since the valve opening electric energy obtaining portion, after obtaining the first valve opening electric energy of the electromagnetic valve and upon obtaining the second valve opening electric energy of the same electromagnetic valve changes the input electric energy to the valve opening side of the electromagnetic valve with a relatively large change amount per unit of time to a predetermined value by which the electromagnetic valve is insufficient to be opened in response to the first valve opening electric energy, the setting time for operation characteristic can be shortened. Further, after the predetermined value, the input electric energy is changed to the valve opening side with a relatively small change amount. Accordingly, the operation characteristic of the electromagnetic valve can be accurately set. In other words, according to this aspect of the invention, the setting of the operation characteristic can be shortened keeping the detection accuracy of valve opening.

According to the vehicle braking control device associated with the third aspect of the invention, since the auxiliary cylinder is connected to the auxiliary chamber which volume is variable in response to the displacement of the master piston and the auxiliary piston is disposed in the auxiliary cylinder and slidable in response to the volume change of the auxiliary chamber, the stroke amount of the auxiliary piston becomes longer as the flow ratio of the liquid flowing into the wheel cylinder at the time of opening of the electromagnetic valve becomes great. Further, the opening of the electromagnetic valve is judged based on the auxiliary hydraulic pressure and accordingly, the number of obtainable valve opening electric energies (hereinafter referred to as "the number of consecutively obtained valve opening electric energies") in the process of consecutively obtaining the plurality of valve opening electric energies of the electromagnetic valves (hereinafter referred to as "valve opening electric energy consecutive obtaining process") without returning the master piston to the initial position side is restricted to the upper limit stroke amount of the auxiliary piston.

Therefore, according to the third aspect of the invention, the input electric energy is changed at the valve closing side of the electromagnetic valve with accompanying of the obtaining of the valve opening electric energies. Thus, the increase of the stroke amount of the auxiliary piston due to the opening of the electromagnetic valve can be avoided and without returning the master piston to the initial position side, the number of consecutively obtainable valve opening electric energies, or the number of consecutive obtained valve opening electric energies becomes large and therefore the setting time of the operation characteristic of the electromagnetic valve based on the plurality of valve opening electric energies can be shortened.

According to the vehicle braking control device associated with the fourth aspect of the invention, as similar to the third aspect, since the auxiliary hydraulic pressure generating portion is provided, the stroke amount of the auxiliary piston becomes longer as the flow ratio of the brake fluid flowing into the wheel cylinder at the time of opening of the electromagnetic valve becomes great. It is noted that the amount of brake fluid flowing into the wheel cylinder by the opening of the electromagnetic valve corresponds to the characteristic of brake fluid amount flowing into the wheel cylinder corresponding to the hydraulic pressure to be applied thereto.

Therefore, at the valve opening electric energy consecutive obtaining process, when the valve opening electric energy of the electromagnetic valve provided at one of the wheel cylinders into which a relatively smaller amount of the brake fluid flows relative to the hydraulic pressure to be applied to the one of the wheel cylinders is obtained last, the stroke amount of the auxiliary piston reaches to the upper limit stroke before obtaining the last valve opening electric energy of the electromagnetic valve. Accordingly, it may be difficult to obtain the last valve opening electric energy. In this case, the number of the valve opening electric energy consecutive obtaining process, i.e., the number of returning the master piston to the initial position increases and the setting time of the operation characteristic of plurality of electromagnetic valves may be lengthened.

To this structure, according to the vehicle braking control device associated with the fourth aspect of the invention, at the valve opening electric energy consecutive obtaining process, when the valve opening electric energy of the electromagnetic valve provided at one of the wheel cylinders into which a relatively larger amount of the brake fluid flows corresponding to the hydraulic pressure to be applied to the one of the wheel cylinders is obtained last. Thus the stroke amount of the auxiliary piston can be lessened before obtaining the last valve opening electric energy of the electromagnetic valve. Therefore, the setting time for the operation characteristics of plurality of electromagnetic valves can be shortened.

According to the vehicle braking control device associated with the fifth aspect of the invention, by obtaining the first and the second valve opening electric energies, the operation characteristic of the electromagnetic valve is set based on the first and the second valve opening electric energies. The second valve opening electric energy is set to be the valve opening electric energy when the second pressure differential which is larger than the first pressure differential is generated. Accordingly, the amount of brake fluid flowing into the wheel cylinder when the electromagnetic valve is opened to obtain the second valve opening electric energy becomes greater than the amount of brake fluid flowing into the wheel cylinder when the electromagnetic valve is opened to obtain the first valve opening electric energy. Thus, at the valve opening electric energy consecutive obtaining process, when the first valve opening electric energy is lastly obtained, it may be considered that the last valve opening electric energy may not be obtained. For this reason, it is necessary to reduce the number of consecutive obtaining of the valve opening electric energies at the valve opening electric energy consecutive obtaining process and this causes the elongation of the setting time of the operation characteristics of the electromagnetic valves.

To this issue, according to the fifth aspect of the invention, the second valve opening electric energy is obtained last. This can reduce the stroke amount of the auxiliary piston before obtaining the last valve opening electric energy, to shorten the setting time of the operation characteristic.

According to the vehicle braking control device associated with the sixth aspect of the invention, similar to the feature of the third aspect of the invention above, the vehicle braking control device is provided with the auxiliary hydraulic pressure generating portion. As the amount of brake fluid flowing into the wheel cylinder due to the opening of the electromagnetic valve becomes great, the stroke amount of the auxiliary piston becomes great. It is noted that the brake fluid amount flowing into the wheel cylinder due to the opening of the electromagnetic valve becomes great, when the pressure differential between the master cylinder side pressure and the wheel cylinder side pressure is great. Accordingly, upon obtaining the first and the second valve opening electric energies of the plurality of electromagnetic valves by repeatedly executing the valve opening electric energy consecutive obtaining processes for a plurality of times, all of the consecutively obtained electric energies are defined to be the second valve opening electric energy which is larger than the first valve opening electric energy. Then before obtaining the entire second valve opening electric energies, the stroke amount of the auxiliary piston may have reached to the upper limit stroke amount. In this case, the number of times of the execution of the opening electric energy consecutive obtaining processes, in other words, the number of times of returning the master piston to the initial position increases and the setting time for operation characteristics of the plurality of electromagnetic may become longer.

To this, according to the sixth aspect of the invention, a part of the consecutively obtaining plurality of valve opening electric energies at the valve opening electric energy consecutive obtaining process is defined to be the first valve opening electric energy and the rest of the obtained plurality of valve opening electric energies is defined to be the second valve opening electric energy. In other words, according to the sixth aspect of the invention, at the first time valve opening electric energy consecutive obtaining process, both the first and the second valve opening electric energies are set to be included for the subject of the obtaining electric energy. Therefore, by combining the number of obtaining the valve opening electric energies (the number of obtained first valve opening electric energies and the number of obtained second valve opening electric energies) at the valve opening electric energy consecutive obtaining process, the first and the second valve opening electric energies of the plurality of the electromagnetic valves can be obtained with less number of times at the valve opening electric energy consecutive obtaining process. According to this process, the setting time for the operation characteristics for a plurality of electromagnetic valves can be shortened.

BRIEF EXPLANATION OF ATTACHED DRAWINGS

EMBODIMENTS OF THE INVENTION

The embodiments of the invention will be explained with reference to the attached drawings. It is noted that since the drawings are illustrated conceptually and accordingly, the sizes and dimensions of the detail structure are not defined <First Embodiment>

Figure 1:
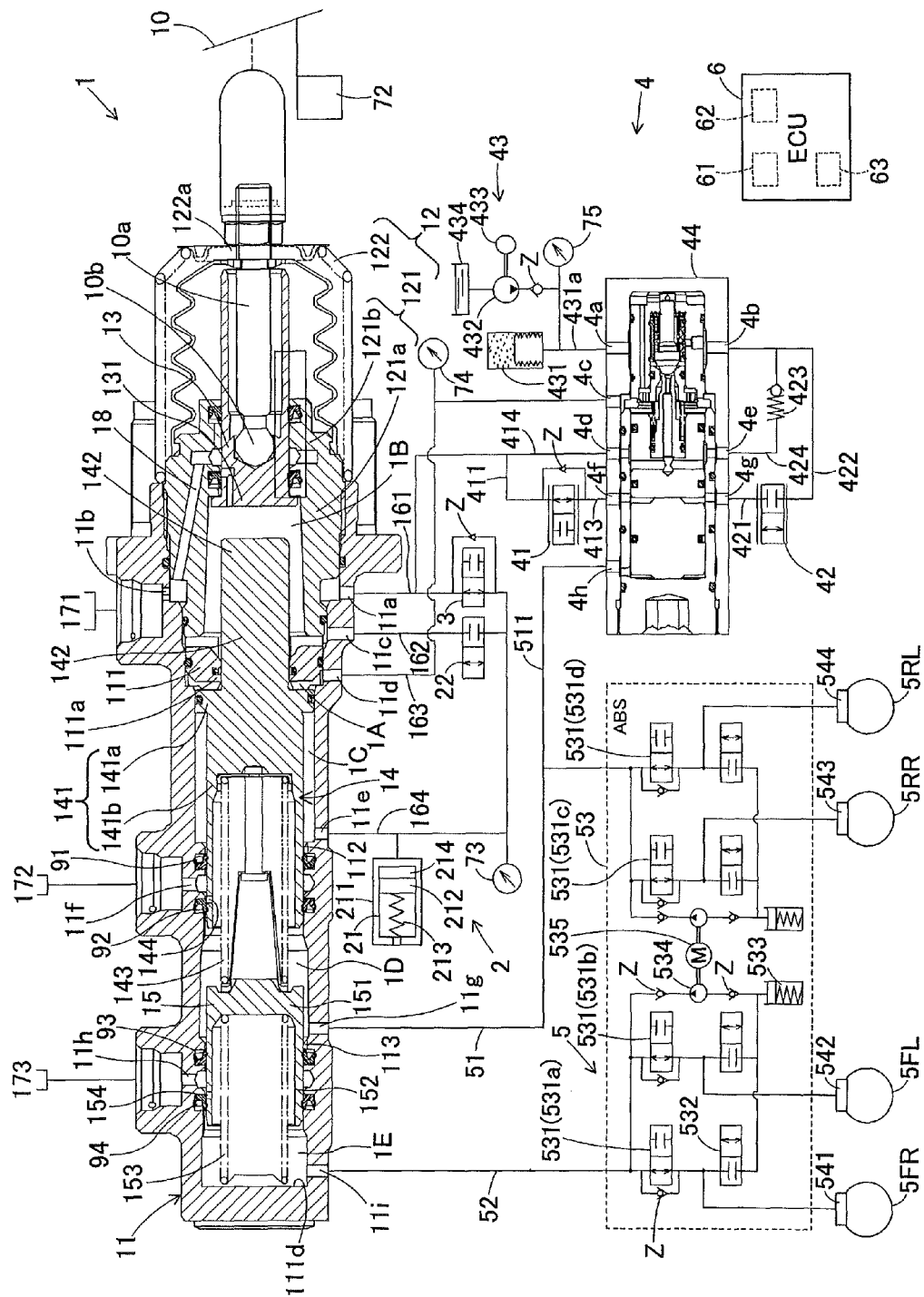
FIG. 1 is a partial cross sectional view explaining the general structure of the vehicle brake device according to a first embodiment of the invention.

The vehicle braking control device according to the first embodiment of the invention mainly includes, as shown in FIG. 1, a master cylinder 1, a reaction force generating device 2, a separation lock valve 22, a reaction force valve 3, a servo pressure generating device 4, a brake device 5, a brake ECU 6, various types of sensors 72 through 75 which are communicably connected to the brake ECU 6. It is noted that according to the embodiments of the invention, a well-known hybrid ECU (not shown) is connected to the brake ECU 6. According to the first embodiment, the vehicle braking control device is formed by the brake ECU 6 and the reaction force generating device 2.

(Master Cylinder 1)

The master cylinder 1 supplies the brake device 5 with the brake fluid and is formed mainly by a main cylinder 11, a cover cylinder 12, an input piston 13, a first master piston 14 and a second master piston 15.

The main cylinder 11 is formed in a substantially bottomed cylinder shape having an opening at rear end thereof and a bottom surface at a front end. It is noted that hereinafter the master cylinder 1 will be explained that the opening side of the main cylinder 11 is "rear side" and the bottom surface side is the front side". The main cylinder 11 includes therein an inner wall portion 111, which separates the cylinder into the opening side and bottom surface side. An inner circumferential surface of the inner wall portion 111 is provided with a through-hole 111a in an axial direction (front/rear direction) at a central portion thereof.

The main cylinder 11 includes therein a small diameter portion 112 (front side) and a small diameter portion 113 (rear side), at which an inner diameter of the main cylinder 11 is smaller than the rest, at locations forwardly of the inner wall portion 111. In other words, the small diameter portions 112, 113 project from the inner circumferential surface of a portion of the main cylinder 11 in an axial direction. A first master piston 14 and a second master piston 15 (which will be explained later in detail) are provided inside the main cylinder 11 and are slidably movable along the main cylinder 11 in the axial direction. The ports which establish communication between the inside and outside of the master cylinder will be explained later.

The cover cylinder 12 includes an approximately cylindrical portion 121 and a cup-shaped cover portion 122. The cylindrical portion 121 is arranged at a rear end of the main cylinder 11 and is coaxially fitted into the opening of the main cylinder 11. An inner diameter of a front portion 121a of the cylindrical portion 121 is formed to be greater than an inner diameter of the through-hole 111a. Furthermore, the inner diameter of the rear portion 121b is formed to be greater than an inner diameter of the front portion 121a.

The cover portion 122 is assembled to a rear end portion of the main cylinder 11 and an outer peripheral surface of the cylindrical portion 121 in a manner that the opening of the main cylinder 11 and the rear end side opening of the cylindrical portion 121. A through-hole 122a is formed at a bottom wall of the cover portion 122. The cover portion 122 is made from an elastic material extendable and compressible in an axial direction thereby to bias the bottom wall in a rearward direction.

The input piston 13 is configured to slidably move inside the cover cylinder 12 in response to an operation of a brake pedal 10. The input piston 13 is formed in a substantially bottomed cylinder shape having a bottom surface at a front portion thereof and an opening at a rear portion thereof. A bottom wall 131 forming the bottom surface of the input piston 13 has a greater diameter than other portions of the input piston 13. The input piston 13 is arranged at the rear end portion 121b of the cylindrical portion 121 slidably and liquid-tightly movable in an axial direction and the bottom wall 131 is inserted into an inner peripheral side of the front portion 121a of the cylindrical portion 121.

An operating rod 10a for operating the brake pedal 10 and a pivot 10b are provided inside of the input piston. The operating rod 10a extends outside of the piston passing through the opening of the input piston 13 and the through-hole 122a of the cover portion 122 and is connected to the brake pedal 10. The operating rod 10a moves in response to the operation to the brake pedal 10 when the brake pedal 10 is depressed. The operating rod 10a advances in a forward direction while compressing the cover portion 122 in the axial direction. The input piston 13 also advances in response to the forward movement of the operating rod 10a.

The first master piston 14 is arranged in the main cylinder 11 and is slidably movable in an axial direction. More specifically, the first master piston 14 includes a first main body portion 141, and a projection portion 142. The first main body portion 141 is arranged coaxially within the main cylinder 11 at a location forward of an inner wall portion 111. The first main body portion 141 is formed in a substantially bottomed cylinder shape having an opening at a front portion thereof and a bottom wall 141a at a rear portion thereof. In other words, the first main body portion 141 includes the bottom wall 141a and a peripheral wall portion 141b.

The bottom wall 141a is slidably and liquid-tightly in the main cylinder 11 in an axial direction and arranged at a front of the inner wall portion 111 thereof. The peripheral wall portion 141b has a diameter smaller than the diameter of the bottom wall 141a to be formed of a cylindrical shape. The peripheral wall portion 141b extends coaxially with the bottom wall 141a from a front end central surface thereof. The front portion of the peripheral wall portion 141b is slidably and liquid-tightly disposed in the small diameter portion 112 in an axial direction and the rear portion of the peripheral wall portion 141b is separated from the inner peripheral surface of the main cylinder 11.

The projection portion 142 is formed at the first main body portion 141 extending rearward from the end surface central portion of the bottom wall 141a of the first main body portion 141. The projection portion 142 is slidably and liquid-tightly disposed in the through-hole 111a of the inner wall portion 111 in an axial direction. The rear portion of the projection portion 142 is positioned in the inner side of the cylindrical portion 121 through the through-hole 111a but is separated from the inner peripheral surface of the cylindrical portion 121. The rear end surface of the projection portion 142 is separated from a bottom wall 131 of the input piston 13 by a predetermined distance. The first master piston 14 is biased in a rear direction by a compression member 143 such as a coil spring.

It is noted here that a servo chamber 1A is defined by the rear end surface of the bottom wall 141a of the first main body portion 141, the front end surface of the inner wall portion 111, the inner peripheral surface of the main cylinder 11 and the outer peripheral surface of the projection portion 142. Further, a first reaction force chamber 1B is defined by the rear end surface of the inner wall portion 111, outer surface of the input piston 131, the inner peripheral surface of the front end surface of the front portion 121a of the cylindrical portion 121 and the outer surface of the projection portion 142. A second reaction force chamber 10 (corresponding to an auxiliary chamber) is defined by the front end surface of the bottom wall 141a, rear end surface of the small diameter portion 112 (including seal member 91), the outer peripheral surface of the peripheral wall portion 141b and the inner peripheral surface of the main cylinder 11.

The second master piston 15 is coaxially arranged within the main cylinder 11 at a location forward of the first master piston 14 and is slidably movable in an axial direction. The second master piston 15 is formed in a substantially bottomed cylinder shape having an opening at a front portion thereof and a bottom wall 151 at a rear portion. In other words, the second master piston 15 is formed by the bottom wall 151, and a peripheral wall portion 152 which has the same diameter with the bottom wall 151.

The bottom wall 151 is disposed between the small diameter portions 112 and 113 at a front of the first master piston 14. The rear portion (including the bottom wall) of the second master piston 15 is separated from the inner peripheral surface of the main cylinder 11. The peripheral wall portion 152 is of a cylindrical shape and extends frontward from the bottom wall 151 coaxially therewith. The peripheral wall portion 152 is slidably and liquid-tightly disposed in the small diameter portion 113 in an axial direction. The second master piston 15 is biased rearward by a compression member 153 made by, for example, a coil spring.

It is noted here that a first master chamber 1D is defined by the outer side front surface of the second master piston 15, front end surface of the first master piston 14, inner side front surface of the first master piston 14, front end surface (including seal member 92) of the small diameter portion 112, rear end surface (including seal member 93) of the small diameter portion 113 and inner peripheral surface of the main cylinder 11 between the small diameter portions 112 and 113. Further, a second master chamber 1E is defined by an inner bottom surface 111d of the main cylinder 11, front end surface of the second master piston 15, inner side front surface of the second master piston 15, front end surface (including seal member 94) of the small diameter portion 113 and the inner peripheral surface of the main cylinder 11.

Ports 11a to 11i, which connect the inside and the outside, are formed at the master cylinder 1. The port 11a is formed at the main cylinder 11 at a location rearward of the inner wall portion 111. The port 11b is formed at the main cylinder 11 opposite to the port 11a at approximately the same location in the axial direction. The port 11a and the port 11b are in communication through a clearance formed between the inner circumferential surface of the main cylinder 11 and the outer circumferential surface of the cylindrical portion 121. The port 11a is connected to a conduit 161. The port 11b is connected to a reservoir 171. In other words, the port 11a is connected to the reservoir 171.

The port 11b is in communication with the first reaction force chamber 1B via a passage 18 formed at the cylindrical portion 121 and the input piston 13. The fluid communication through the passage 18 is interrupted when the input piston 13 moves forward. In other words, when the input piston 13 moves forward, the first reaction force chamber 1B and the reservoir 171 are disconnected from each other.

The port 11c is formed at a location forward of the port 11a and connects the first reaction force chamber 1B with a conduit 162. The port 11d is formed at a location forward of the port 11c and connects the servo chamber 1A with a conduit 163. The port 11e is formed at a location forward of the port 11d and connects the second reaction force chamber 1C with a conduit 164.

The port 11f is formed between the sealing members 91, 92 of the small diameter portion 112 and connects a reservoir 172 with the inside of the main cylinder 11. The port 11f is in communication with the first master chamber 1D via a passage 144 formed at the first master piston 14. The passage 144 is formed at a location slightly rearward of the sealing member 92 so that the port 11f and the first master chamber 1D are disconnected from each other when the first master piston 14 moves forward.

The port 11g is formed at a location forward of the port 11f and connects the first master chamber 1D with a conduit 51. The port 11h is formed between the sealing members 93, 94 of the small diameter portion 113 and connects a reservoir 173 with the inside of the main cylinder 11. The port 11g is in communication with the second master chamber 1E via a passage 154 formed at the second master piston 15. The passage 154 is formed at a location slightly rearward of the sealing member 94 so that the port 11g and the second master chamber 1E are disconnected from each other when the second master piston 15 moves forward. The port 11i is formed at a location forward of the port 11h and connects the second master chamber 1E with a conduit 52.

A sealing member such as an O-ring and the like (see black circles in the drawings) are appropriately provided within the master cylinder 1. The sealing members 91, 92 are provided at the small diameter portion 112 and liquid-tightly contact the outer circumferential surface of the first master piston 14. Similarly, the sealing members 93, 94 are provided at the small diameter portion 113 and liquid-tightly contact the outer circumferential surface of the second master piston 15. Additionally, sealing members are provided between the input piston 13 and the cylindrical portion 121.

The stroke sensor 72 is a sensor which detects a stroke amount (operation amount) of the brake pedal 10 and transmits the detection result to the brake ECU 6.

(Reaction Force Generating Device 2)

The reaction force generating device 2 is provided with a stroke simulator 21 (corresponding to auxiliary hydraulic pressure generating portion). The stroke simulator 21 generates a reaction force hydraulic pressure in the first reaction force chamber 1B and the second reaction force chamber 1C in response to the operation force of the brake pedal 10. The stroke simulator 21 is generally configured in such a manner that an auxiliary piston 212 is fitted into an auxiliary cylinder 211 while being allowed to slidably movable therein and a reaction force pressure chamber 214 is formed at a location forward of the auxiliary piston 212, which is biased in the forward direction by a compression spring 213. The stroke simulator 21 is connected to the second reaction force chamber 1C via the conduit 164 and the port 11e, and is connected further to the separation lock valve 22 and the reaction force valve 3 via the conduit 164. The auxiliary piston 212 slides within the auxiliary cylinder 211 in response to the volume change of the second reaction force chamber 1C when the separation lock valve 22 and the reaction force valve 3 are closed. A hydraulic pressure (corresponding to the auxiliary hydraulic pressure) is generated in the second reaction force chamber 1C in response to the stroke position of the first master piston 14. Accordingly, it can be said also that in the second reaction force chamber 1C, a hydraulic pressure in response to the displacement of the first master piston 14 is generated.

(Separation Lock Valve 22)

The separation lock valve 22 is a normally closed type electromagnetic valve and opening and closing thereof is controlled by the brake ECU 6. The separation lock valve 22 is disposed between the conduit 164 and the conduit 162 for controlling to establish or disconnect communication between the two conduits 162 and 164. The separation lock valve 22 is a valve for controlling the fluid communication for establishment and interruption between the first reaction force chamber 1B and the second reaction force chamber 1C.

The pressure sensor 73 is a sensor which mainly detects the pressure (reaction force pressure) in the reaction force chambers 1B and 1C and is connected to the conduit 164. The pressure sensor 73 detects the pressures of both reaction force chambers 1B and 1C while the separation lock valve 22 is in an open state. On the other hand, while the separation lock valve 22 is in a closed state, the pressure sensor 73 detects the pressure of the second reaction force chamber 1C (corresponding to the auxiliary hydraulic pressure).

(Reaction Force Valve 3)

The reaction force valve 3 is a normally-open-type electromagnetic valve and is configured so that opening and closing thereof is controlled by the brake ECU 6. The reaction force valve 3 is disposed between the conduit 164 and the conduit 161 for establishing communication therebetween. The reaction force valve 3 connects or disconnects the reaction force chambers 1B and 1C with or from the reservoir 171.

(Servo Pressure Generating Device 4)

The servo pressure generating device 4 mainly includes a pressure decreasing valve 41, a pressure increasing valve 42, a pressure supplying portion 43 and a regulator 44. The pressure decreasing valve 41 is a normally-open-type electromagnetic valve and flow-rate therethrough is controlled by the brake ECU 6. One port of the pressure decreasing valve 41 is connected to the conduit 161 via a conduit 411, and the other port of the pressure decreasing valve 41 is connected to a conduit 413. More specifically, the one outlet/inlet port of the pressure decreasing valve 41 is in communication with the reservoir 171 via the conduits 411, 161, and ports 11a, 11b. The pressure increasing valve 42 is a normally-closed-type electromagnetic valve and the flow-rate of the pressure increasing valve 42 is controlled by the brake ECU 6. One outlet/inlet port of the pressure increasing valve 42 is connected to a conduit 421, and the other outlet/inlet port of the pressure increasing valve 42 is connected to a conduit 422.

The pressure supplying portion 43 is a portion to supply a highly pressurized brake fluid to the regulator 44 based on the instructions from the brake ECU 6. The pressure supplying portion 43 mainly includes an accumulator 431, a hydraulic pressure pump 432, a motor 433 and a reservoir 434.

The accumulator 431 is a tank in which the pressurized brake fluid is accumulated. The accumulator 431 is connected to the regulator 44, a pressure sensor 75 and the hydraulic pressure pump 432 via a conduit 431a. The hydraulic pressure pump 432 is connected to the motor 33 and the reservoir 434 and is driven by the motor 433 and supplies the accumulator 431 with the brake fluid accumulated in the reservoir 434 when the motor 433 is driven. The pressure sensor 75 detects the pressure in the accumulator 431.

When the pressure sensor 75 detects that the accumulator hydraulic pressure decreases to a value equal to or lower than a predetermined value, the motor 433 is driven on the basis of a control signal from the brake ECU 6, and the hydraulic pressure pump 432 supplies the brake fluid with the accumulator 431 to supplement pressure energy therein.

The regulator 44 is structure in such manner that a sub piston 446 is added to a generally used regulator. In other words, the regulator 44 as shown in FIG. 2 is structured mainly by a cylinder 441, a ball valve 442, a biasing portion 443, a valve seat portion 444, a control piston 445 and the sub-piston 446.

Figure 2:
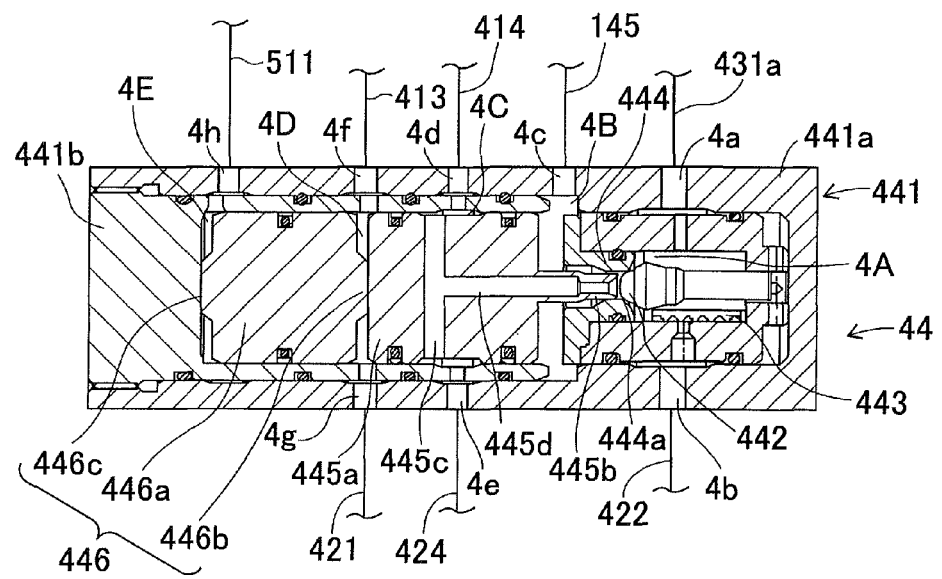
FIG. 2 is a partial cross sectional view illustrating a configuration of a regulator structure.

The cylinder 441 includes a cylinder case 441a formed in a substantially bottomed cylinder-shape having a bottom surface at one end thereof (at the right side in FIG. 2), and a cover member 441b closing an opening of the cylinder case 441a (at the left side in FIG. 2). The cover member 441b is formed to be substantially U-shaped in cross-section in FIG. 2. However, the regulator 44 is explained here with the cover member 441b as a columnar-shaped member, and a portion that closes the opening of the cylinder case 441a as the cover member 441b in this embodiment. The cylinder case 441a is provided with plural ports 4a to 4h through which the inside and the outside of the cylinder case 441a are in communication.

The port 4a is connected to the conduit 431a. The port 4b is connected to the conduit 422. The port 4c is connected to the conduit 163. The port 4d is connected to the conduit 161 via the conduit 411. The port 4e is connected to a conduit 424, which is connected to the conduit 422 via a relief valve 423. The port 4f is connected to the conduit 413. The port 4g is connected to the conduit 421. The port 4h is connected to a conduit 511, which is diverged from the conduit 51.

The ball valve 442 is a valve having a ball shape at an end portion thereof. The ball valve 442 is provided within the cylinder 441 at a location closer to the bottom surface of the cylinder case 441a (which will be hereinafter referred to also as a cylinder bottom surface side). The biasing portion 443 is a spring member biasing the ball valve 442 towards the opening of the cylinder case 441a (which will be hereinafter referred to also as a cylinder opening side), and is provided at the bottom surface of the cylinder case 441a. A through passage 444a through which the divided cylinder opening side and the cylinder bottom surface side are in communication is formed at a center of the valve seat portion 444. The valve seat portion 444 supports the ball valve 442 from the cylinder opening side by closing the through passage 444a by the biased ball valve 442.

A space defined by the ball valve 442, the biasing portion 443, the valve seat portion 444, and an inner peripheral surface of the cylinder case 441a positioned at the cylinder bottom surface side is referred to as a first chamber 4A. The first chamber 4A is filled with the brake fluid and is connected to the conduit 431a via the port 4a and to the conduit 422 via the port 4b.

The control piston 445 includes a main body portion 445a formed in a substantially columnar shape and a projection portion 445b formed in a substantially columnar shape having a smaller diameter than the main body portion 445a. The main body portion 445a is provided inside the cylinder 441 in a coaxial and fluid-tight manner relative to the cylinder opening side of the valve seat portion 444, while allowing the main body portion 445a to be slidably movable in the axial direction. The main body portion 445a is biased towards the cylinder opening side by portion of a biasing member, which is not illustrated in the attached drawings. A passage 445c is formed at a substantially intermediate portion of the main body portion 445a in the cylinder axial direction. The passage 445c extends in the radial direction (in an up-and-down direction in FIG. 2) so that both end portions thereof open at a circumferential surface of the main body portion 445a. A portion of an inner circumferential surface of the cylinder 441 corresponding to the location of the opening of the passage 445c is provided with the port 4d and is formed to be recessed so as to form a third chamber 4C together with the main body portion 445a.

The projection portion 445b projects towards the cylinder bottom surface side from a center portion of an end surface of the main body portion 445a facing the cylinder bottom surface. The projection portion 445b is formed so that the diameter thereof is smaller than the diameter of the through passage 444a of the valve seat portion 444. The projection portion 445b is coaxially provided relative to the through passage 444a. An end portion of the projection portion 445b is spaced apart from the ball valve 442 towards the cylinder opening by a predetermined distance. A passage 445d is formed at the projection portion 445b so that the passage 445d extends in the cylinder axial direction and opens at a center portion of an end surface of the projection portion 445b facing the cylinder bottom surface. The passage 445d extends to the inside of the main body portion 445a and is connected to the passage 445c.

A space defined by the end surface of the main body portion 445a facing the cylinder bottom surface, an outer surface of the projection portion 445b, the inner circumferential surface of the cylinder 441, the valve seat portion 444, and the ball valve 442 is referred to as a second chamber 4B. The second chamber 4B is in communication with the ports 4d and 4e via the passages 445c and 445d and the third chamber 4C.

The sub-piston 446 includes a sub main body portion 446a, a first projection portion 446b, and a second projection portion 446c. The sub main body portion 446a is formed in a substantially columnar shape. The sub main body portion 446a is provided within the cylinder 441 in the coaxial and fluid-tight manner relative to the cylinder opening side of the main body portion 445a while allowing the sub main body portion 446a to be slidably movable in the axial direction.

The first projection portion 446b is formed in a substantially columnar shape having a smaller diameter than the sub main body portion 446a and projects from a center portion of an end surface of the sub main body portion 446a facing the cylinder bottom surface. The first projection portion 446b contacts an end surface of the main body portion 445a facing the cylinder opening. The second projection portion 446c is formed in the same shape as the first projection portion 446b. The second projection portion 446c projects from a center portion of an end surface of the sub main body portion 446a facing the cylinder opening. The second projection portion 446c contacts the cover member 441b.

A space defined by the end surface of the sub main body portion 446a facing the cylinder bottom surface side, an outer surface of the first projection portion 446b, an end surface of the control piston 445 facing the cylinder opening, and the inner circumferential surface of the cylinder 441 is referred to as a pressure control chamber 4D. The pressure control chamber 4D is in communication with the pressure decreasing valve 41 via the port 4f and the conduit 413, and with the pressure increasing valve 42 via the port 4g and the conduit 421.

On the other hand, a space defined by the end surface of the sub main body portion 446a facing the cylinder opening, an outer surface of the second projection portion 446c, the cover member 441b, and the inner circumferential surface of the cylinder 441 is referred to as a fourth chamber 4E. The fourth chamber 4E is in communication with the port 11g via the port 4h and the conduits 511, 51. Each of the chambers 4A through 4E is filled with the brake fluid. The pressure sensor 74 is a sensor that detects the pressure (servo pressure) to be supplied in the servo chamber 1A and is connected to the conduit 163.

(Vehicle Brake Device 5)

The first master chamber 1D and the second master chamber 1E, which generate the master cylinder hydraulic pressure are in communication with wheel brake cylinders 541 through 544 via the conduits 51, 52 and the ABS 53. Further, the wheel brake cylinders 541 through 544 form the brake device 5 for each of the vehicle wheels 5FR through 5RL. More specifically, the port 11g of the first master chamber 1D and the port 11i of the second master chamber 1E are connected respectively through the conduits 51 and 52 to a well-known ABS (Anti-Lock Brake System) 53. The ABS 53 is then connected to the wheel cylinders 541 through 544 which apply braking force on the vehicle wheels 5FR through 5RL.

The ABS 53 will be explained here particularly to the one which is associated with the vehicle wheel (5FR). The other structures of other portions are similar to the other brake devices 5 associated with the remaining vehicle wheels and the explanation thereof will be omitted. The ABS 53 includes an input valve 531 (corresponding to an electromagnetic valve), a pressure decreasing valve 532, a reservoir 533, a pump 534 and a motor 535. The input valve 531 is a normally open type electromagnetic valve and the opening and closing operation thereof is controlled by the brake ECU 6. The input valve 531 is connected to the conduit 52 at one side and connected to the wheel cylinder 541 and the pressure decreasing valve 532 at the other side.

In more detail, the input valve 531 according to the embodiment of the invention is an electromagnetic valve in which a force to interrupt a flow passage (for example, a force biasing the valve member to the master cylinder 1 side relative to the opening) in response to the electric energy supplied thereto is variable and larger the input electric energy, larger the force to interrupt becomes great. When the force applied to the wheel cylinder 541 through 544 side from the master cylinder 1 side (i.e., the pressure difference between the wheel cylinder 541 through 544 side and the master cylinder 1 side) exceeds the force to interrupt the flow passage, the input valve 531 opens. Thus the input valve 531 has an operation characteristic (IP characteristic) which is a relationship between the input electric energy and the pressure differential between the master cylinder 1 side pressure and the wheel cylinder 541 through 544 side pressure with respect to the input valve 531 when the valve is opened (immediately before or immediately after the opening of the valve) and the input valve controls the brake fluid flow between the master cylinder 1 and the wheel cylinders 541 through 544 in response to the inputted electric energy. It is noted that a check valve z is provided in the input valve 531 in a reverse direction with respect to the opening direction of the input valve per se.

The pressure decreasing valve 532 is a normal close type electro-magnetic valve and the opening and closing operation is controlled by the brake ECU 6. The pressure decreasing valve 532 is connected to the wheel cylinder 541 and the input valve 531 at one side and is connected to the reservoir 533 at the other side. When the pressure decreasing valve 532 is opened, fluid communication between the wheel cylinder 541 and the reservoir 533 is established.

The reservoir 533 is a tank for reserving therein the brake fluid and is in communication with the conduit 52 via the pressure decreasing valve 532 and the pump 534. The pump 534 is connected to the reservoir 533 at the suction port and the discharge port is connected to the conduit 52 via a one-way valve "z". It is noted here that the one-way valve "z" allows the flow from the pump 534 to the second master chamber 1E via the conduit 52 (second master chamber 1E), but restricts the flow in opposite direction. The pump 534 is driven by the motor 535 which is actuated by a command from the brake ECU 6. The pump 534 suctions the brake fluid stored in the reservoir 533 or in the wheel cylinder 541 and returns the brake fluid to the second master chamber 1E under the pressure decreasing mode of the ABS control. It is noted that a damper chamber (not shown) is provided in the discharge side of the pump 534 to dampen the pulsation of the brake fluid discharged by the pump 534.

The ABS 53 includes a vehicle wheel speed sensor 76 which detects the vehicle wheel speed at each of the vehicle wheels. The vehicle wheel speed sensor 76 sends the detection signal indicating the vehicle wheel speed to the brake ECU 6.

According to the thus structured ABS 53, the brake ECU 6 controls switching of the opening/closing of each of the input valves 531 and 532 on the basis of the master cylinder pressure, the vehicle wheel speed, and a front/rear acceleration speed and activates the motor 535 if necessary thereby adjusting the brake hydraulic pressure applied to the wheel cylinder 541, i.e. the hydraulic pressure braking force applied to the vehicle wheel 5FR for executing the ABS control (Anti-Lock Brake Control). The ABS 53 is a hydraulic pressure supplying device which supplies the brake fluid supplied from the master cylinder 1 with the wheel cylinders 5FR through 5RL by adjusting the amount and the timing of the brake fluid supply based on the instructions from the brake ECU 6

At the linear mode which will be explained later, a servo pressure is generated in the servo chamber 1A by controlling the hydraulic pressure supplied from the accumulator 431 of the servo pressure generating device 4 by the pressure increasing and decreasing valves 42 and 41. Then the first and the second master pistons 14 and 15 advance to pressurize the fluid in the first and the second master chambers 1D and 1E. Thus pressurized brake fluid in the first and the second master chambers 1D and 1E is supplied to the wheel cylinders 541 through 544 via the ports 11g and 11i, conduits 51 and 52 and the ABS 53 as the master cylinder pressure and hydraulic pressure braking force is applied to each of the vehicle wheels 5FR through 5RL.

Regarding to the fluid rigidity of the wheel cylinders 541 through 544, the fluid rigidity of the wheel cylinders 541 and 542 provided at the front wheels 5FR and 5FL is lower than that of the wheel cylinders 543 and 544 provided at the front wheels 5RR and 5RL. It is noted that the fluid rigidity is defined by an easiness of the pressure increase for a cylinder. In other words, the fluid rigidity is determined by the necessary fluid amount by which the pressure in the cylinder reached to a predetermined value that is necessary for increasing the pressure for the cylinder. When the fluid rigidity is low, the necessary fluid amount to raise the pressure has to be large but when the fluid rigidity is high, such necessary fluid amount may be less. Accordingly, the brake fluid is more easily flown into the wheel cylinders when the fluid rigidity is low compared to the wheel cylinders with a high fluid rigidity.

(Brake ECU 6)

The brake ECU 6 is an electronic control unit and controls each of the electromagnetic valves 22, 3, 41, 42, 531 and 532 and motors 433 and 535 through communication with the various sensors 72 through 75. The brake ECU 6 memorizes two operation modes, the "linear mode" and the "regulator mode". The "linear mode" corresponds to a normal braking operation mode in which the servo pressure in the servo chamber 1A is controlled by controlling the pressure decreasing and increasing valves 41 and 42 under the separation lock valve 22 being opened and the reaction force valve 3 being closed. The regulator mode is an emergency mode in which all of the pressure decreasing, pressure increasing separation lock and the reaction force valves 41, 42, 22 and 3 are controlled to be in non-operated state or become in de-energized state due to failure or the like.

(Operation Under Braking Operation)

The operation under a braking operation will be explained hereinafter. When the brake pedal 10 is depressed, the input piston 13 advances and the passage 18 is interrupted to interrupt communication between the reservoir 171 and the first reaction force chamber 1B. Under the linear mode above, since the reaction force valve 3 is controlled to be in open state and accordingly both reaction force chambers 1B and 1C are in fluid communication and the communication with the reservoir 171 is interrupted. The stroke simulator 21 generates the reaction force pressure in both reaction force chambers 1B and 1C in response to the stroke amount.

Even the reaction force pressure is generated in both reaction force chambers 1B and 1C, such reaction force acts on both of the rear end surface (rear end surface of the projection portion 142) and the front end surface (front end surface of the bottom wall 141a) of the first master piston 14, the master piston is driven by the servo pressure. On the other hand, under the REG (regulator) mode, since the reaction force valve 3 is controlled to be in open state and the separation lock valve 22 is controlled to be in closed state, the first reaction force chamber 1B is in liquid-tight state, whereas the second reaction force chamber 1C is in communication with the reservoir 171. The first master piston 14 is driven by the operation force by the brake pedal 10 (depression force).

(Operation Characteristic Setting Control)

Figure 3:
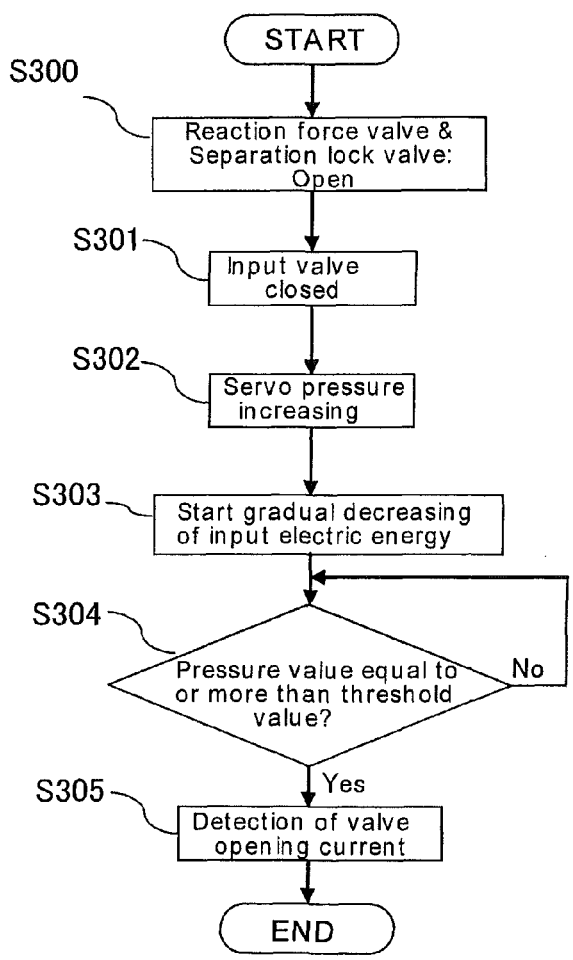
FIG. 3 is a flowchart explaining the operation characteristic according to the first embodiment.

Hereinafter, the control by the brake ECU 6 for setting the operation characteristic of the input valve 531 will be explained. First, the obtaining of valve opening electric energy of one single input valve 531 is explained. As shown in FIG. 3, under the control for setting the operation characteristic, the brake ECU 6 closes the separation lock valve 22 and the reaction force valve 3 (step S300). The brake ECU 6 then controls the pressure decreasing valve 41 and the pressure increasing valve 42 thereby to increase the servo pressure which corresponds to the pressure in the servo chamber 1A regardless of the operation state of the brake pedal 10 and sends the command to an electric energy supplying portion (not shown) to supply a predetermined electric energy with the input valve 531. Then the input valve 531 is closed (step S301).

The brake ECU 6 continues to increase the servo pressure by controlling the pressure decreasing valve 41 and the pressure increasing valve 42 and a predetermined pressure differential (later explained first and second pressure differentials P1 and P2) is generated between the master cylinder 1 side and the wheel cylinder 541 through 544 side (step S302). With the increase of the servo pressure, the master pistons 14 and 15 advance to increase the master cylinder pressure (pressure in the master cylinder 1). Then a pressure differential is generated between the master cylinder 1 side and the wheel cylinder 541 through 544 side at the closed state input valve 531. The pressure at the master cylinder 1 side is higher than the pressure at the wheel cylinder 541 through 544 side. The pressure differential between the master cylinder 1 and the wheel cylinders 541 through 544 corresponds to the increased master pressure after the input valve 531 is closed when both pressures between the master cylinder 1 and the wheel cylinders 541 through 544 (in other words, the master pressure and wheel pressure) become equal pressure by increasing the both pressures of the master cylinder 1 and the wheel cylinders 541 through 544 to a predetermined level pressure under the input valve 531 being in open state. The wheel pressure increases as the master pressure increases and both pressures become substantially the same with each other. Accordingly, the brake ECU 6 identifies the wheel pressure based on the master pressure at the time the input valve 531 is closed. Further, the brake ECU 6 can be arranged to close the input valve 531 before the master pressure increases to decrease the wheel (cylinder) pressure to be substantially zero and under such state the pressure differential may be generated.

Figure 4:
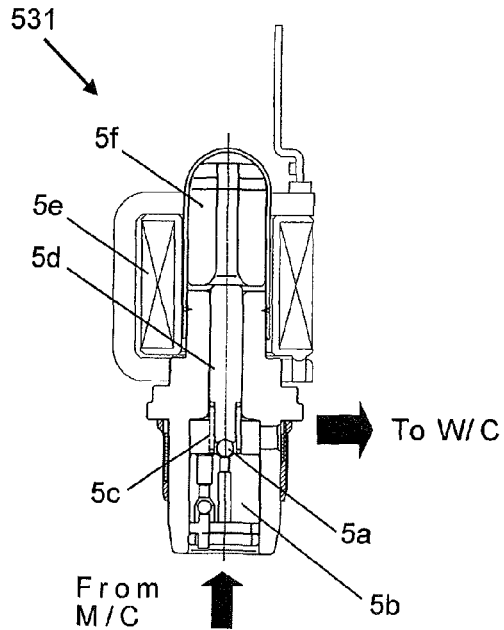
FIG. 4 is a conceptual view explaining the input valve.

Thereafter, the brake ECU 6 gradually reduces the input electric energy to the input valve 531 (step S303). The input valve 531 is conceptually explained here. The valve 531 is formed by a valve member 5a which closes the conduit and a biasing member 5b for biasing the valve member 5a towards the master cylinder side as shown in FIG. 4. When the input electric energy to the input valve 531 increases, the biasing force of the biasing member 5b increases by an operation of a solenoid 5c and when the input electric energy decreases, the biasing force of the biasing member 5b decreases by the operation of the solenoid 5c. Accordingly, when the input electric energy is decreased gradually, the input valve 531 opens at a certain timing being overwhelmed by the predetermined pressure differential. When the input valve 531 opens the brake fluid is flown to the wheel cylinder 541 through 544 side from the highly pressurized master cylinder 1 side. Thus the master pressure decreases and the master pistons 14 and 15 advance by the servo pressure. By the advance movement of the first master piston 14, the volume of the second reaction force chamber 1C decreases and the brake fluid in the second reaction force chamber 1C flows into the stroke simulator 21. Thus, the auxiliary piston 212 is pushed in to increase the pressure in the reaction force chamber 214.

The brake ECU 6 gradually decreases the input electric energy and then judges whether the pressure to be measured by the pressure sensor 73 becomes equal to or more than a predetermined threshold value determined in advance (predetermined pressure) (step S304). If the pressure is judged that the pressure value exceeds the predetermined threshold value (step S304: Yes), the brake ECU 6 judges that the input valve 531 has been open and detects the input electric energy to the input valve 531 at the time that the pressure value becomes equal to or more than the predetermined threshold value and memorizes the detected input electric energy value (step S305). Thus, the valve opening electric current to the input valve 531, a minimum value valve opening voltage or a minimum value valve opening electric energy with respect to or corresponding to the predetermined pressure differential can be obtained. Further, according to the embodiment, the input electric energy of the input valve 531 can be controlled to open the input valve when the brake ECU 6 judges that the input valve 531 has opened (step S306). In other words, the brake ECU 6 raises the input electric energy to a value by which the input valve 531 closes after the detection of the valve opening. This can prevent the brake fluid from flowing towards the wheel cylinder 541 through 544 side from the master cylinder 1 side by the opening of the input valve 531 and accordingly, the increase of the stroke amount of the auxiliary piston 212 of the stroke simulator 211 can be restricted. When the brake fluid in the master cylinder 1 flows out, the master pistons 14 and 15 advance and in response to the advance movement of the first master piston 14, the volume of the second reaction force chamber 1C decreases to advance the auxiliary piston 212.

Thus, the brake ECU 6 gradually decreases the current value to the input valve 531 under a constant voltage state and obtains a first valve opening current I1 of the input valve 531 relative to the first pressure differential P1 (corresponding to the first valve opening electric energy). Further, by similar control, the brake ECU 6 obtains a second valve opening current I2 of the input valve 531 corresponding to the second pressure differential P2 which is a different value from the first pressure differential P1 (In this case, P1<P2) (corresponding to the second valve opening electric energy). The operation characteristic (IP characteristics) of the input valve 531 can be calculated based on the first and the second valve opening currents I1 and I2.

It is noted here that in this specification (description) the "control of input electric energy" broadly includes any of the "electric current control" and the "electric voltage control" for the input valve 531. Further, it is also noted that the "detection of the input electric energy" includes the detection of the input electric current and the detection of the input electric voltage. Further, at the step S304, whether a change of the pressure value of the pressure sensor 73 is equal to or greater than a predetermined range or not may be judged. In other words, the threshold value for detecting the opening of the input valve 531 can be set to be the change amount (change range) of the pressure in the second reaction force chamber 1C.

The execution of the process for obtaining the valve opening current for one of the input valves 531 may be carried out by the methods explained above. According to this embodiment, the execution of the process for setting the operation characteristics of the input valves 531 corresponding to each wheel cylinder 541 through 544 consecutively. It is noted here that the process for "consecutively obtaining the valve opening currents for each of the plurality of input valves 531 without returning the master pistons 14 and 15 to the respective initial positions thereof" is called as the "valve opening electric current consecutive obtaining process" (corresponding to the "valve opening electric energy consecutive obtaining process"). One input valve 531a is installed at the corresponding wheel cylinder 541 which alternatively corresponds to the vehicle wheel 5FR, another input valve 531b is installed at another wheel cylinder 542 which corresponds to the vehicle wheel 5FL, still another input valve 531c is installed at another wheel cylinder 543 which corresponds to the vehicle wheel 5RR and the last input valve 531d is installed at the last wheel cylinder 544 which corresponds to the vehicle wheel 5RL.

Figure 5:
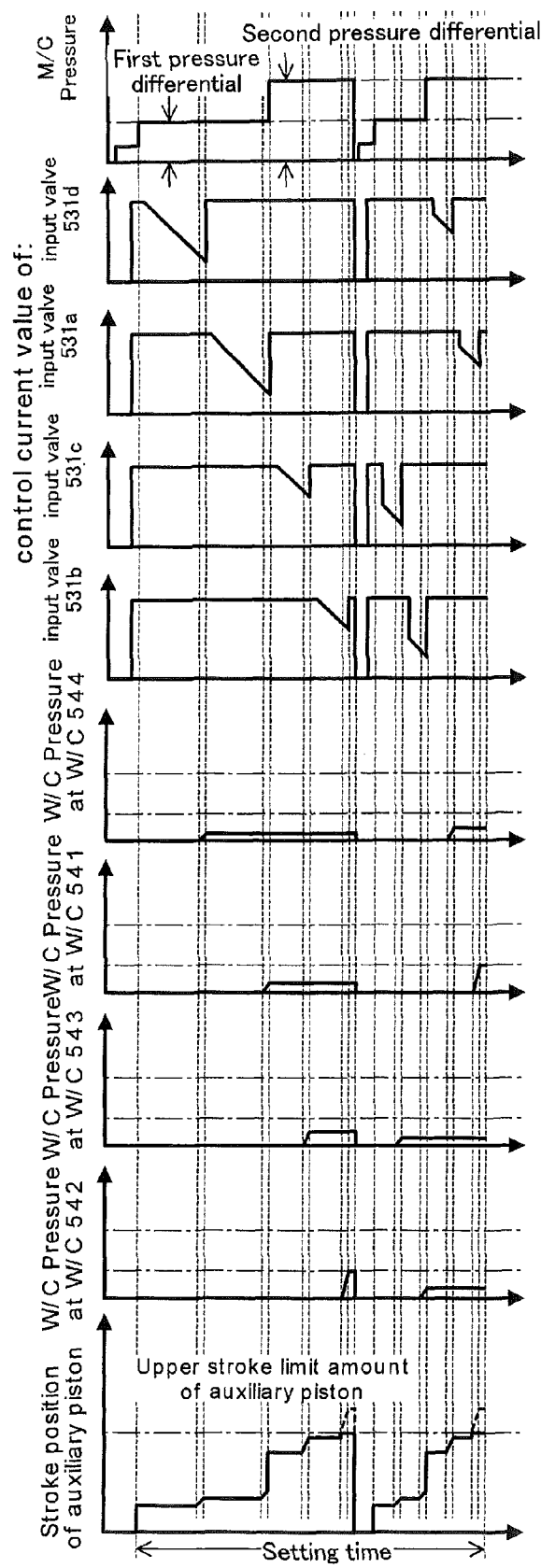
FIG. 5 is a time chart explaining the operation characteristic obtaining control process according to the first embodiment.
Figure 6:
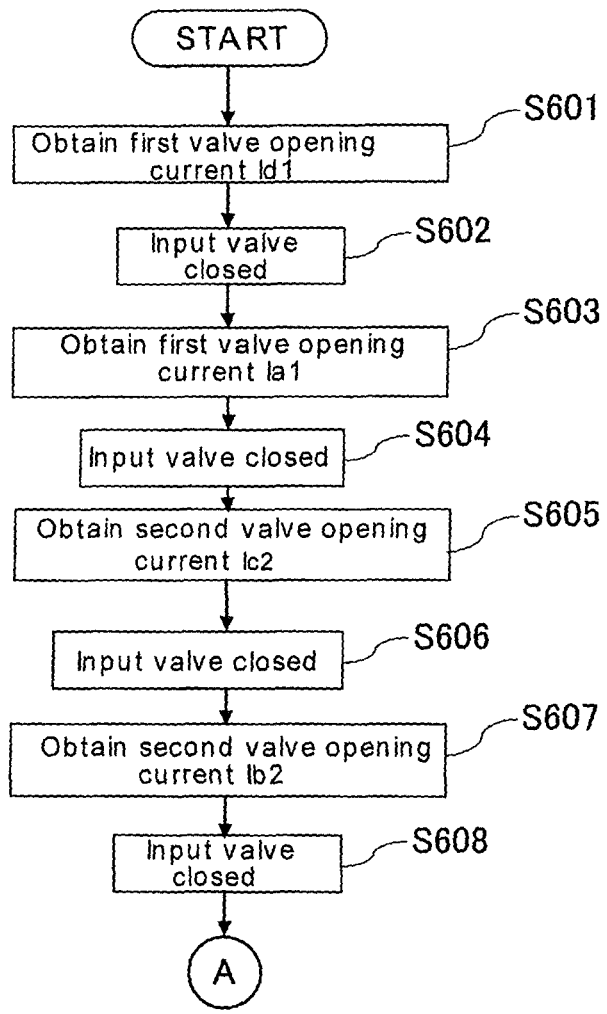
FIG. 6 is a flowchart explaining the operation characteristic obtaining control process according to the first embodiment.

According to the operation characteristic setting control process of the embodiment, as shown in FIG. 5, first, a pressure differential P1 is generated between the master cylinder 1 side and the wheel cylinder 541 through 544 side to obtain a first valve opening current Id1. The brake ECU 6 controls to gradually decrease the input electric energy to the input valve 531d and after the brake ECU 6 judged that the input valve 531d has opened, the brake ECU 6 controls to instantly raise the input current to the value that can close the input valve 531d.

After the first valve opening current Id1 has been obtained, the input valve 531d is closed and the brake fluid flow stops and the change of the pressure differential between the master cylinder 1 side and the wheel cylinder 541 through 544 side becomes minimized. Therefore, the advancement of the auxiliary piston 212 (stroke amount increasing direction) can be prevented. Further, due to the closing of the input valve 531d, the pressure differential between the master cylinder 1 side and the wheel cylinder 542 through 544 side can be stabled within a short time period. This can enable movement into the following valve opening current obtaining control process for the next valve. The pressure in the wheel cylinder 544 is increased by the opening of the input valve 531d and is kept constant by the closing of the input valve 531d. The stroke amount of the auxiliary piston 212 increases when the input valve 531d is opened and the increase thereof stops when the input valve 531d is closed.

Next, the brake ECU 6 obtains another first valve opening current Ia1 for the input valve 531a keeping the first pressure differential P1. Regarding to the obtaining of the first valve opening current Ia1 the brake ECU 6 starts gradual decreasing control of the electric energy for the input valve 531a after closing of the input valve 531d. After the brake ECU 6 judged that the input valve 531a has opened, the brake ECU 6 instantly raises the input electric energy for the input valve 531a to the current value that closes the input valve 531a.

The pressure in the wheel cylinder 541 is raised by the opening of the input valve 531a and is kept constant by the closing state of the input valve 531a. The brake fluid easily flows into the wheel cylinders 543 and 544 each of which fluid rigidities is lower than the fluid rigidities of the other wheel cylinders 541 and 542. Since the fluid rigidity of the wheel cylinder 541 is low, a larger amount of brake fluid flows into upon opening of the input valve 531a, than the amount upon the opening of the input valve 531d. Thus the stroke amount of the auxiliary piston 212 becomes larger than the stroke amount in the case of opening of the input valve 531d. The stroke amount of the auxiliary piston 212 increases when the input valve 531a is open and by closing of the input valve 531a, the increase of the stroke amount stops.

Next, the brake ECU 6 obtains a second valve opening current Ic2 for the input valve 531c by generating the second pressure differential P2 between the master cylinder 1 side and the wheel cylinders 541 through 544 side. Regarding to the obtaining of the second valve opening current Ic2, the brake ECU 6 starts gradual decreasing control of the electric energy for the input valve 531c after closing of the input valve 531a. After the brake ECU 6 judged that the input valve 531c has opened, the brake ECU 6 instantly raises the input electric energy for the input valve 531c to the current value that closes the input valve 531c.

The pressure in the wheel cylinder 543 is raised by the opening of the input valve 531c and is kept constant by the closing of the input valve 531c. Since the second pressure differential P2 is set to be larger than the first pressure differential P1, the amount of brake fluid flowing into the wheel cylinder 543 becomes larger when the input valve 531c is open and accordingly, the pressure raising level of the wheel cylinder 543 also increases correspondingly. The stroke amount of the auxiliary piston 212 increases as the second pressure differential P2 is generated and after reached to the constant amount level, the amount increases by the opening of the input valve 531c and the increase stops when the input valve 531c closes. At this point the stroke amount of the auxiliary piston 212 is less than the upper limit stroke amount. Accordingly, the stroke amount change (pressure value change of the pressure sensor 73) by the opening of the last input valve 531b (the valve corresponding to the last (the fourth) vehicle wheel) can be detectable.

Next, the brake ECU 6 obtains another second valve opening current Ib2 for the input valve 531b keeping the second pressure differential P2. Regarding to the obtaining of the second valve opening current Ib2, the brake ECU 6 starts gradual decreasing control of the electric energy for the input valve 531b after closing of the input valve 531c. After the brake ECU 6 judged that the input valve 531b has opened, the brake ECU 6 instantly raises the input electric energy for the input valve 531b to the current value that closes the input valve 531b. It is noted however, that the valve closing control after the opening of the valve may be omitted for the last input valve 531b.

The pressure in the wheel cylinder 542 is raised by the opening of the input valve 531b and is kept constant by the closing of the input valve 531b. Since the second pressure differential P2 is larger than the first pressure differential P1, the amount of brake fluid flowing into the wheel cylinder 542 becomes larger when the input valve 531b is open and accordingly, the pressure raising level of the wheel cylinder 542 also increases correspondingly. Since the fluid rigidity of the wheel cylinder 542 is low, the amount larger than the amounts of the wheel cylinders 543 and 544 flows into the wheel cylinder 542. The stroke amount of the auxiliary piston 212 increases when the input valve 531ab is open and by closing of the input valve 531b, the increase of the stroke amount stops. According to this embodiment, the stroke amount of the auxiliary piston 212 reached to the upper limit stroke amount during the opening of the input valve 531b and stops before the input valve 531b closes.

By the control indicated above, the first valve opening current I1 or the second valve opening current I2 can be obtained for all of the input valves 531a through 531d with one time valve opening current consecutive obtaining process. After the valve opening judgment for the input valves 531a through 531d, by closing these valves 531a through 531d, it is possible to move to the next valve opening current consecutive obtaining process for all of the input valves 531a through 531d in a shortened time and in addition the flowing of the brake fluid towards the wheel cylinder 541 through 544 side can be prevented which accordingly prevents the increase of the stroke amount of the auxiliary piston 212.

As explained above, by obtaining the first valve opening current I1 and the second valve opening current I2 in a mixed manner with the one-time valve opening current consecutive obtaining process, the total stroke amount of the auxiliary piston 212 can be reduced compared to the case of obtaining only all of the second valve opening currents I2 by one time valve opening current consecutive obtaining process and the reaching of the stroke amount of the auxiliary piston 212 to the upper limit stroke amount before obtaining the valve opening current obtaining of the last input valve 531 can be prevented. Further, by setting the input valves 531b or the input valve 531a which are low in fluid rigidity among the all input valves 531a through 531d to be the last input valve 531 for the valve opening current obtaining subject, the reaching of the stroke amount of the auxiliary piston 212 to the upper limit stroke amount before obtaining the valve opening current obtaining of the last input valve 531 can be prevented. Further, by setting the second valve opening current I2 corresponding to the second pressure differential P2 to be the last input valve 531 for the minimum current obtaining subject, the reaching of the stroke amount of the auxiliary piston 212 to the upper limit stroke amount before obtaining the valve opening current obtaining of the last input valve 531 can be prevented. Thus, the first and the second valve opening currents I1 and I2 can be obtained for all of the input valves 531a through 531d with one-time valve opening current obtaining process. According to this embodiment, the operation characteristics of all of the input valves 531a through 531d can be obtained with two times in total of the valve opening current consecutive obtaining process. In other words, by minimum time valve opening current consecutive obtaining processes, the operation characteristics of all of the input valves 531a through 531d can be set, which can shorten the operation characteristic setting time.

After the first time current obtaining control ends (after the closing of the input valve 531b), the brake ECU 6 controls the servo pressure to decrease the master pressure. Then the master pistons 14 and 15 return to the respective initial positions and the second time valve opening current consecutive obtaining control starts. When the first master piston 14 returns to the initial position, the auxiliary piston 212 also returns to the initial position, which means that the stroke amount of the auxiliary piston 212 is approximately zero (0).

After the brake ECU 6 opens all of the input valves 531a through 531d, the brake ECU 6 closes the valves 531a through 531d under the master pressure being raised.

The brake ECU 6 generates the first pressure differential P1 between the master cylinder 1 side and the wheel cylinder 541 through 544 side and obtains the first valve opening current Ic1 of the input valve 531c. Upon obtaining the first minimum current Ic1, the brake ECU 6 decreases the input electric energy instantly to the predetermined value based on the value of the second valve opening current Ic2 of the input valve 531c obtained at the first current obtaining control. If the value of the second valve opening current Ic2 of the input valve 531c is known, the operation characteristic of the input valve 531c can be presumed within a predetermined deviation range and accordingly, a certain range of the current value for the first valve opening current Ic1 can be assumed.

The brake ECU 6 memorizes the deviation range of one valve opening current corresponding to the other valve opening current obtained by an experimental work or a simulation. Accordingly, the brake ECU 6 increases the change amount of the input electric energy per unit time and instantly decreases thereof to a current value (the predetermined value) which is relatively larger than the maximum current value in the deviation range of the memorized one valve opening current in response to the other valve opening current. The decreasing speed of the input electric energy to the predetermined value is faster than the speed at the gradual decreasing control.

Thus, as explained, the brake ECU 6 decreases the input electric energy of the input valve 531c instantly drops to the predetermined value corresponding to the second valve opening current Ic2 and after that, starts the gradual decreasing control in which the input electric energy is gradually decreased. As explained above, since the brake ECU 6 decreases the input electric energy with a large change amount to the predetermined value before the gradual decreasing control, the time to obtain the valve opening current can be shortened and yet since the change speed at the gradual decreasing control is unchanged, the accuracy of the valve opening detection can be kept.

At the second time valve opening current consecutive obtaining process, the input electric energies for all of the input valves 531a through 531d are instantly decreased to the predetermined value which is determined by the other valve opening current and thereafter the gradual decreasing control is started. The other operations are similar to or the same to those of the first time current obtaining control and therefore, will be explained briefly. After the obtaining of the first valve opening current Ic1 of the input valve 531c, the brake ECU 6 obtains another first valve opening current Ib1 of the input valve 531b keeping the first pressure differential P1 and after obtaining the first valve opening current Ib1, the brake ECU 6 generates the second pressure differential P2 between the master cylinder 1 side and the wheel cylinder 541 through 544 side thereby to obtain the second valve opening current Id2. After obtaining the second valve opening current Id2, the brake ECU 6 obtains the second valve opening current Ia2 of the input valve 531a.

As explained above, according to this embodiment, the brake ECU 6 obtains the first and the second valve opening currents I1 and I2 for all of the input valves 531a through 531d by the two-time valve opening current consecutive obtaining process. The operation characteristics of each input valve 531a through 531d can be set based on the obtained both first and the second valve opening currents I1 and I2.

According to the embodiment, the master pressure is increased to a certain extent before closing the input valves 531a through 531d. The stroke simulator 21 has a specific characteristic that the pressure change amount per unit stroke amount becomes large when the pressure becomes equal to or more than the predetermined value. In this embodiment, using such characteristics of the stroke simulator 21, the input current at the time of opening of the input valve 531 can be more accurately obtained. In more specifically, even the displacement of the auxiliary piston 212 accompanied by the advance movement of the first master piston 14 at the time of opening of the input valve 531 is small in amount, the pressure indicated by the pressure sensor 73 is largely changed (increased). Therefore, the brake ECU 6 can detect the advance movement of the first master piston 14, i.e., the valve opening timing of the input valve 531 with a high sensibility. It is noted that in FIG. 5, the pressure increase of the wheel cylinders 541 through 544 and the stroke increase of the auxiliary piston 212 accompanied by the increase of the master pressure before the closing of the input valves 531a through 531d have been omitted from the drawings.

The control flow of the operation characteristic setting according to the first embodiment will be briefly explained hereinafter. First, the brake ECU 6 obtains the first valve opening current Id1 at the step S601, and the input valve 531d is closed at the step S602. Next, the brake ECU 6 obtains the first valve opening current Ia1 at the step S603 and the input valve 531a is closed at the step S604. Then the brake ECU 6 obtains the second valve opening current Ic2 at the step S605 and the input valve 531c is closed at the step S606. Then the brake ECU 6 obtains the second valve opening current Ib2 at the step S607 and the input valve 531b is closed at the step S608. By these obtaining processes, the first valve opening current consecutive obtaining process ends.

Figure 7:
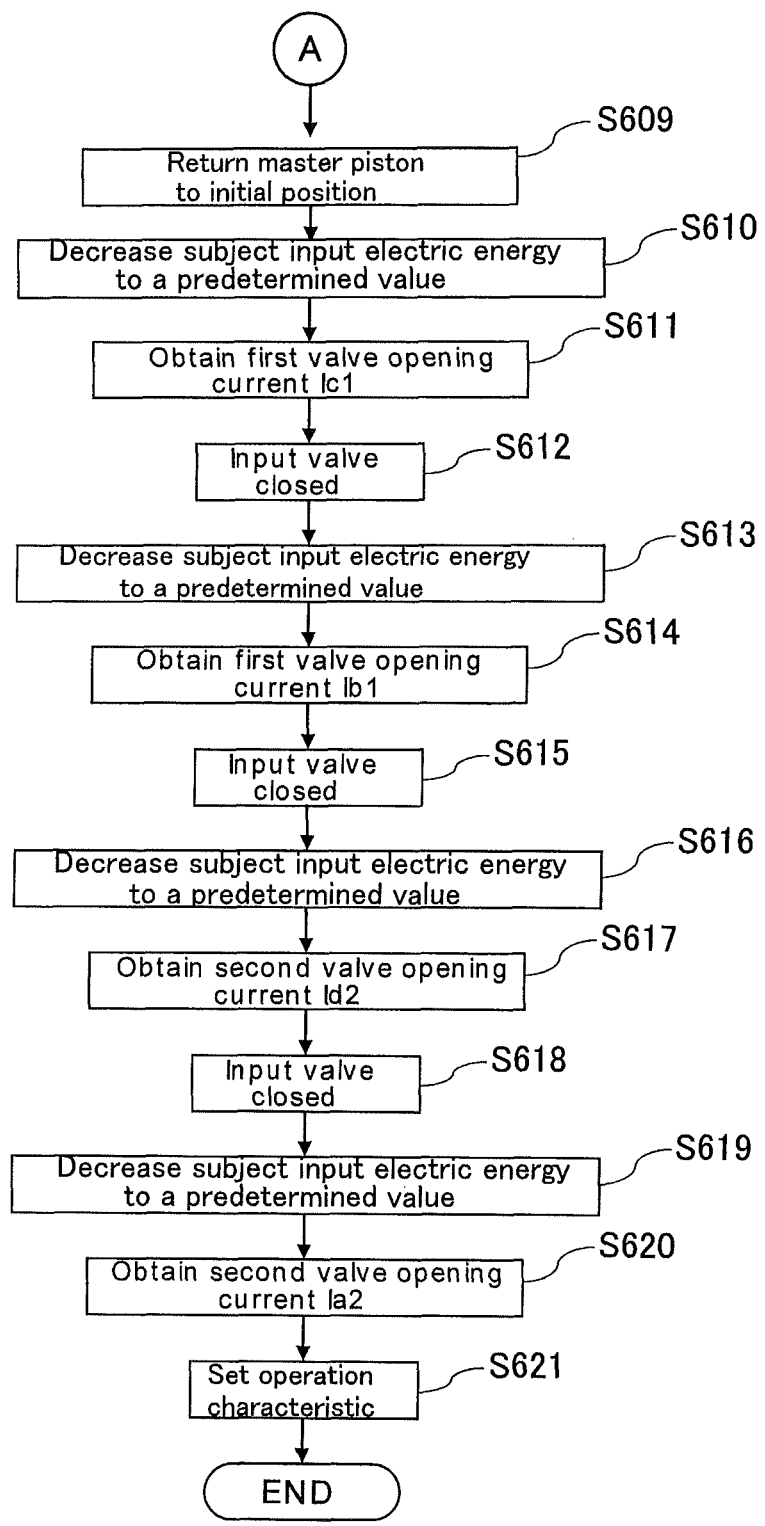
FIG. 7 is a flowchart explaining the operation characteristic obtaining control process according to the first embodiment.

Next, as shown in FIG. 7, the brake ECU 6 moves the master pistons 14 and 15 to the respective initial positions thereof at the step S609 thereby to increase the master pressure and to close all of the input valves 531a through 531d. The brake ECU 6 then decreases the input electric energy of the input valve 531b to the predetermined value at the step S610. Thereafter the brake ECU 6 obtains the first valve opening current Ib1 by the gradual decreasing control at the step S611 to close the valve 531b at the step S612. Similarly, the brake ECU 6 decreases the input electric energy of the input valve 531c to the predetermined value at the step S613. Thereafter the brake ECU 6 obtains the first valve opening current Id by the gradual decreasing control at the step S614 to close the valve 531c at the step S615. Similarly, thereafter the brake ECU 6 decreases the input electric energy of the input valve 531d to the predetermined value at the step S616. Thereafter the brake ECU 6 obtains the second valve opening current Id2 by the gradual decreasing control at the step S617, thereby to close the input valve 531d at the step S618.

Finally, the brake ECU 6 decreases the input electric energy of the input valve 531a to the predetermined value at the step S619 and obtains the second valve opening current Ia2 by the gradual decreasing control at the step S620. Thus, the brake ECU 6 obtains the first valve opening currents Ia1, Ib1, Id and Id1 and the second valve opening currents Ia2, Ib2, Ic2 and Id2. The brake ECU 6 functions as a valve opening electric energy obtaining means at the steps S601 through S620 and sets the operation characteristics of each of the input valves 531a through 531d at the step S621. The brake ECU 6 functions as an operation characteristic setting means at the step S621. Further, the brake ECU 6 functions as a pressure differential generating means by controlling the servo pressure to control the pressure decreasing and the increasing valves 41 and 44 so that the first pressure differential P1 is generated between the master cylinder 1 side and the wheel cylinder 541 through 544 side upon generation of the first pressure differential P1 between the master cylinder 1 side and the wheel cylinder 541 through 544 side and controlling the servo pressure to control the pressure decreasing and the increasing valves 41 and 44 so that the second pressure differential P2 is generated between the master cylinder 1 side and the wheel cylinder 541 through 544 side upon generation of the second pressure differential P2 between the master cylinder 1 side and the wheel cylinder 541 through 544 side. In other words, the brake ECU 6 functionally includes the valve opening electric energy obtaining means 61, the operation characteristic obtaining means 62 and the pressure differential generating means 63.

It is noted that the order of obtaining the valve opening current for each input valve is not limited to the order explained in the above embodiment. However, it is preferable to obtain lastly the second valve opening currents Ia2 and Ib2 for the input valves 531a and 531b provided at the wheel cylinders 541 and 542 which fluid rigidities are lowest among all wheel cylinders 541 through 544. Further, it is preferable to obtain the first and the second valve opening currents in mixture, particularly in an equal manner (in case of four wheel vehicle, two by two) at one-time valve opening current consecutive obtaining process as explained in the above embodiment. Under such situation, it is preferable that the brake ECU 6 consecutively obtains one side (valve opening current of the same pressure differentials). The subject of the operation characteristic setting is not limited to the input valves 531 of the ABS 53, but any electromagnetic valve which is interposed between the master cylinder 1 and the wheel cylinders 541 through 544 may be the subject for setting the operation characteristic.

<Second Embodiment>

Figure 8:
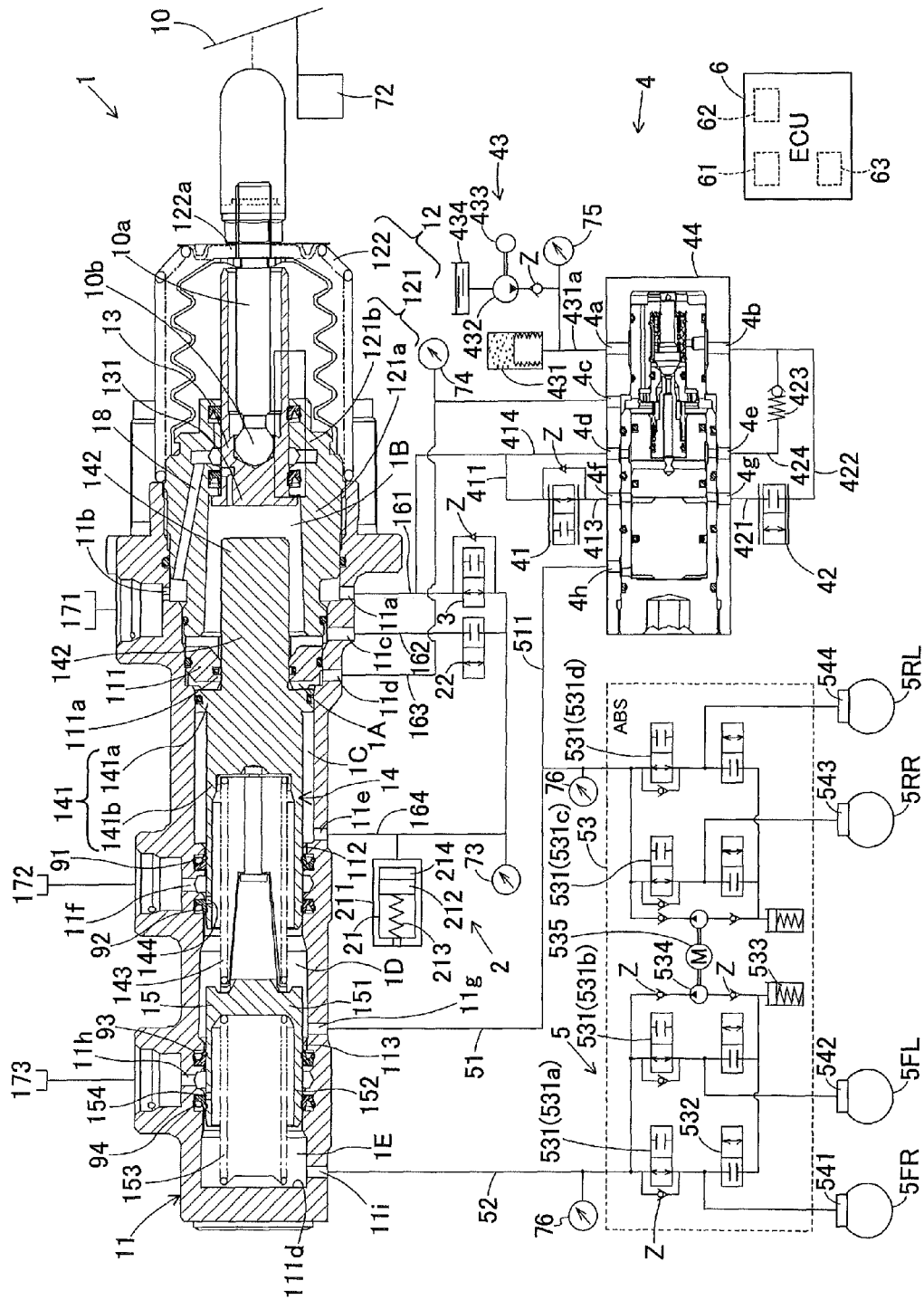
FIG. 8 is a partial cross sectional view explaining the general structure of the vehicle brake device according to a second embodiment of the invention.

Next, the second embodiment of the braking control device according to the invention which is different in structure from the first embodiment that the pressure sensor 76 is arranged in the upper stream side of the input valve 531 (between the master cylinder 1 and the input valve 531) as shown in FIG. 8. In more specifically, the pressure sensors 76 are disposed in the conduit 51 and 52, respectively according to the second embodiment.

As similar to the first embodiment, the brake ECU 6 obtains the valve opening electric energy which corresponds to the input electric energy when the input valve 531 was open, by changing the input electric energy towards the opening side of the input valve 531 (gradual decreasing control) with the time proceeding after the input electric energy has been changed so that the input valve 531 closes. Then, according to the first embodiment, the valve opening judgment is made for the input valve 531 based on the pressure value of the pressure sensor 73, however, according to this second embodiment, the valve opening judgment is made for the input valve 531 based on the pressure value of the pressure sensor 76. Therefore, even after the stroke amount of the auxiliary piston 212 reached to the upper limit value, the valve opening current can be obtained unless the stroke amount of the master pistons 14 and 15 reached to their upper limits.

According to the second embodiment, after the brake ECU 6 judged that the input valve 531 opened, the electric energy of the input valve 531 is changed towards the valve opening side with a large change amount per unit of time larger than the change amount at the gradual decreasing control. After the detection of the valve opening, the brake ECU 6 decreases the input electric energy with a high speed higher than the speed at the gradual decreasing control. The other operation characteristic setting controls of the second embodiment are similar or the same to the controls of the first embodiment, and therefore these will be briefly explained hereinafter.

Figure 9:
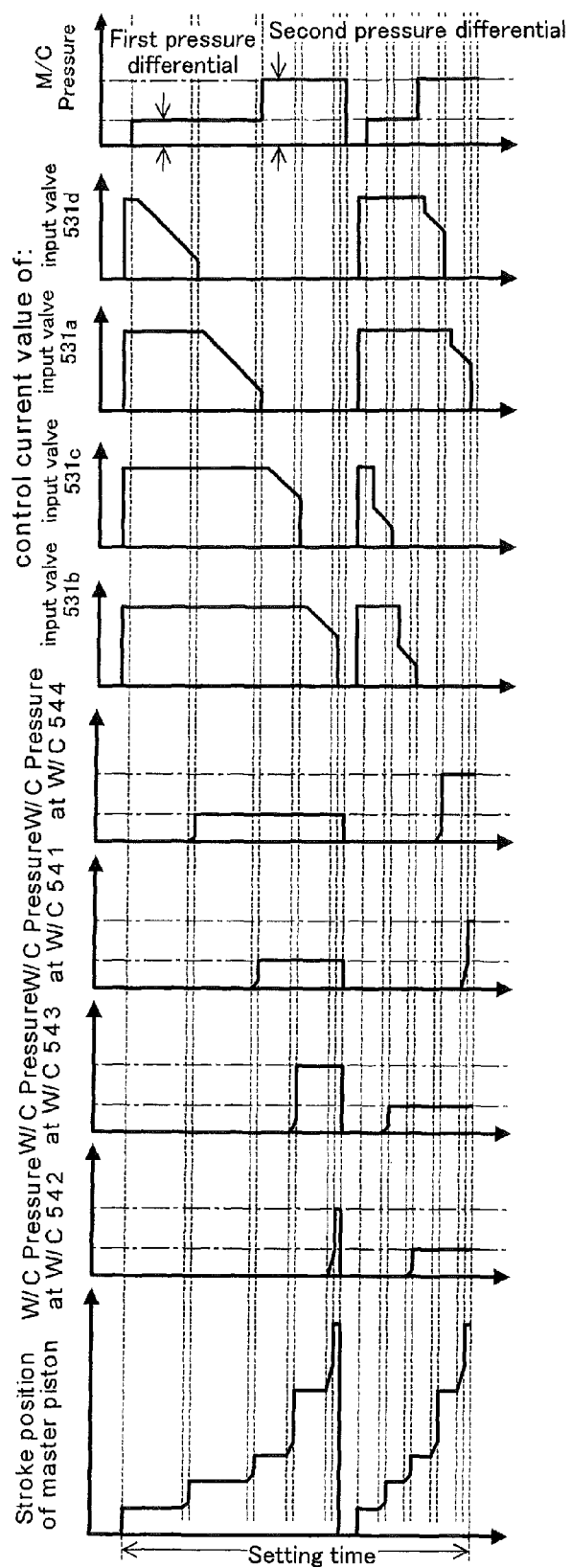
FIG. 9 is a time chart explaining the operation characteristic obtaining control process according to the second embodiment.
Figure 10:
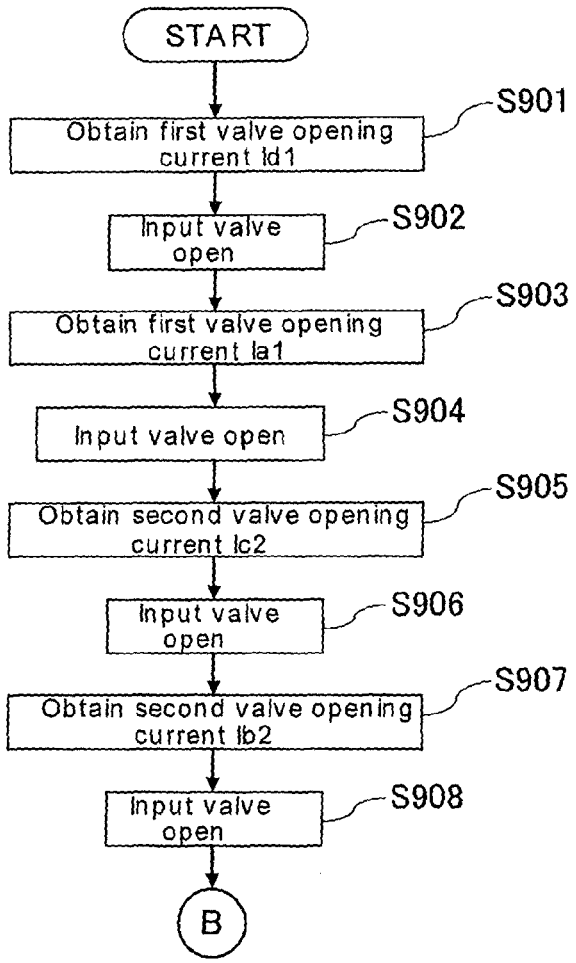
FIG. 10 is a flowchart explaining the operation characteristic obtaining control process according to the second embodiment.
Figure 11:
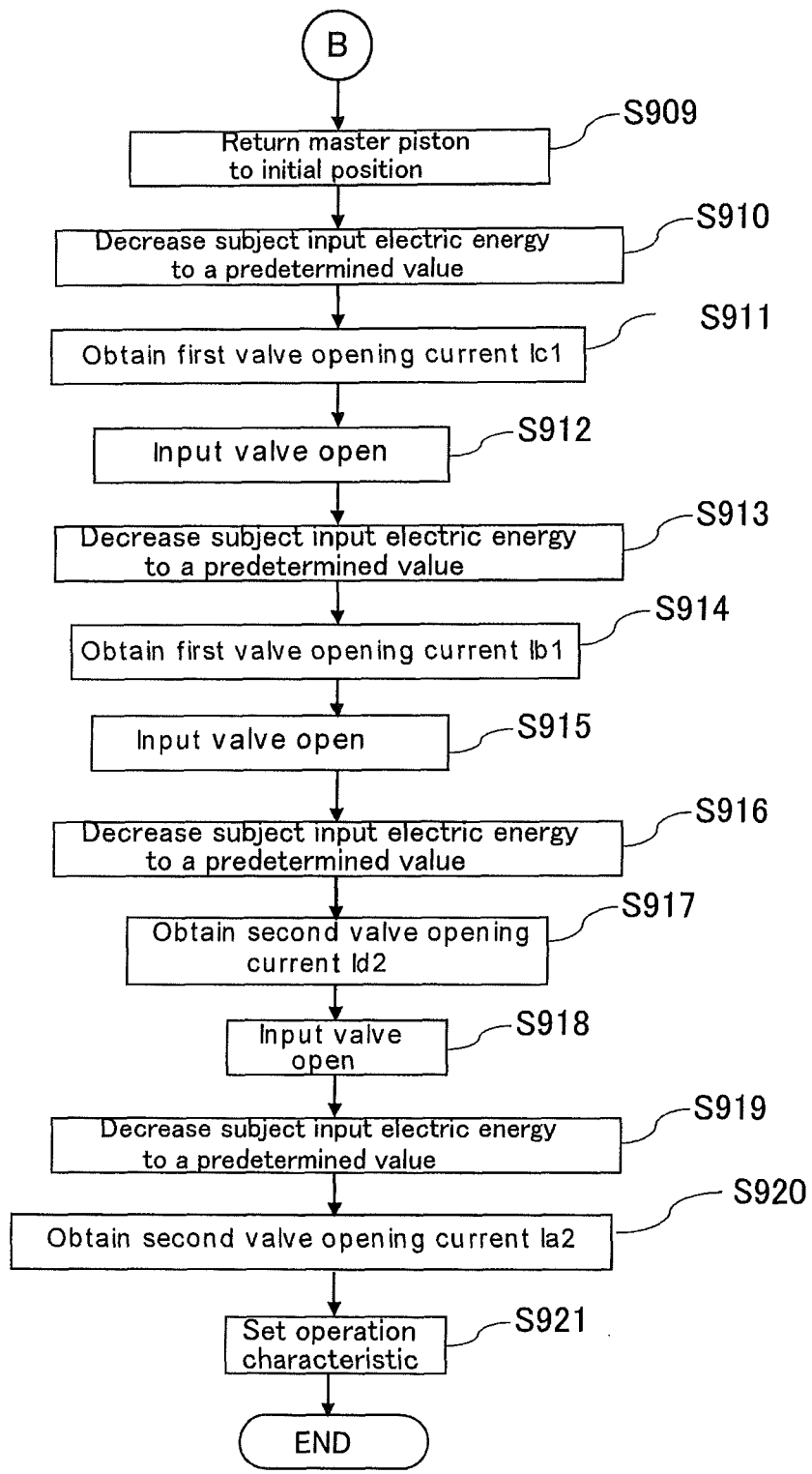
FIG. 11 is a flowchart explaining the operation characteristic obtaining control process according to the second embodiment.

As shown in FIGS. 9 through 11, the brake ECU 6 obtains the first valve opening current Id1 at the step S901 and then the inputting of the input electric energy to the input valve 531*d* is decreased instantly to completely open the input valve 531*d* at the step S902. Then, the brake ECU 6 obtains the first valve opening current Ia1 at the step S903 and then the inputting of the input electric energy to the input valve 531*a* is decreased instantly to completely open the input valve 531*a* at the step S904. Then, the brake ECU 6 obtains the second valve opening current Ic2 at the step S905 and then the inputting of the input electric energy to the input valve 531*c* is decreased instantly to completely open the input valve 531*c* at the step S906. Then, the brake ECU 6 obtains the second valve opening current Ib2 at the step S907 and then the inputting of the input electric energy to the input valve 531*b* is decreased instantly to completely open the input valve 531*b* at the step S908.

Then, the brake ECU 6 returns the master pistons 14 and 15 to their initial positions at the step S909 and increases the master pressure and closes all of the input valves 531*a* through 531*d*. Then, the brake ECU 6 decreases the input electric energy of the input valve 531*c* instantly to the predetermined value corresponding to the second valve opening current Ic2 at the step S910. The brake ECU 6 then obtains the first valve opening current Id by the gradual decreasing control at the step S911 to completely open the input valve 531*c* at the step S912. Similarly, the brake ECU 6 decreases the input electric energy of the input valve 531*b* instantly to the predetermined value corresponding to the second valve opening current Ib2 at the step S913. The brake ECU 6 then obtains the first valve opening current Ib1 by the gradual decreasing control at the step S914 to completely open the input valve 531*b* at the step S915. Similarly, the brake ECU 6 decreases the input electric energy of the input valve 531*d* instantly to the predetermined value corresponding to the first valve opening current Id1 at the step S916. The brake ECU 6 then obtains the second valve opening current Id2 by the gradual decreasing control at the step S917 to completely open the input valve 531*d* at the step S918. Similarly, the brake ECU 6 decreases the input electric energy of the input valve 531*a* instantly to the predetermined value corresponding to the first valve opening current Ia1 at the step S919. The brake ECU 6 then obtains the second valve opening current Ia2 by the gradual decreasing control at the step S920. The brake ECU 6 then sets the operation characteristics of each input valves 531*c* through 531*d* based on the obtained valve opening currents at the step S921. It is noted that similar to the explanation for FIG. 5, in FIG. 9 also the explanations of the pressure increase of the wheel cylinders 541 through 544 and the stroke amount increase of the auxiliary piston 212 responding to the pressure increase of the master cylinder before the opening of the input valves 531*a* through 531*d* are omitted.

According to the second embodiment, after the detection of opening of the input valve 531, the input electric energy to the input valve 531 is instantly decreased to completely close the input valve 531. This can nullify the pressure differential between the master cylinder 1 and the wheel cylinder (one of the cylinders 541 through 544) in a shortened time and the next valve opening current obtaining control for the next input valve 531 can be quickly started, which eventually shortens the operation characteristic setting time.

Similar to the first embodiment, by obtaining of the first and the second valve opening currents I1 and I2 in mixture in one obtaining control, obtaining lastly of the valve opening current for the input valves 531*a* and 531*b* provided at the wheel cylinders 5411 and 542 which are low in fluid rigidity and obtaining lastly of the second valve opening current, the reaching to the upper limit value of the stroke amount of the master pistons 14 and 15 before obtaining the last input valve 531 opening current can be prevented.

It is however, more advantageous to adopt the first embodiment rather than the second embodiment in manufacturing cost and accurate setting of the operation characteristics. According to the first embodiment, the pressure sensor is not necessary to be added, which leads to the reduction of the number of parts and accordingly the reduction of the manufacturing cost.

According to the first embodiment, the operation characteristic is obtained based on the hydraulic pressure in the second reaction force chamber 1C in response to the stroke position of the master piston 1. It is noted here that the structure of the second reaction force chamber 10 can be formed simpler than the structures of the master cylinder 1 and the wheel cylinders 541 through 544. Therefore the deviation between individuals in the hydraulic pressure generated in the second reaction chamber 1C in response to the stoke position of the master piston 1 is smaller than the hydraulic pressure generated in the conduit in which the input valve 531 is provided. Therefore, according to the first embodiment, upon setting the operation characteristics of the input valve 531 based on the pressure change caused by the opening operation of the valve 531, the accurate setting can be achieved by minimizing the influences of the deviation between the individuals. The pressure increase of the wheel cylinders 541 through 544 before opening of the input valves 531*a* through 531*d* is omitted from the attached drawings. Further, the pressure gauge may be provided at the wheel cylinder 541 through 544 side of the input valve 531.

The invention claimed is:

1. A vehicle braking control device adapted to a vehicle brake device having an electromagnetic valve disposed between a master cylinder and a wheel cylinder for controlling brake fluid flow therebetween in response to an input electric energy, comprising:

a pressure differential control portion for generating a predetermined pressure differential between a master cylinder side and a wheel cylinder side with respect to the electromagnetic valve;

a valve opening electric energy obtaining portion for obtaining the input electric energy upon opening of the electromagnetic valve as a valve opening electric energy, by changing the input electric energy towards an opening side of the electromagnetic valve with time, under the predetermined pressure differential being generated by the pressure differential control portion, after the input electric energy has been changed to close the electromagnetic valve; and an operation characteristic setting portion for setting an operation characteristic which is a relationship between the input electric energy to the electromagnetic valve and the predetermined pressure differential between the master cylinder side and the wheel cylinder side with respect to the electromagnetic valve based on the valve opening electric energy obtained by the valve opening electric energy obtaining portion corresponding to the predetermined pressure differential; wherein, the valve opening electric energy obtaining portion changes the input electric energy at a valve closing side or a valve opening side of the electromagnetic valve with an input electric energy change amount per unit of time at the valve closing side or the valve opening side which is larger than the input electric energy change amount per unit of time at the valve closing side or the valve opening side before the time of opening of the electromagnetic valve upon obtaining of the valve opening electric energy, wherein the operation characteristic setting portion sets the operation characteristic of the electromagnetic valve based on a first valve opening electric energy which is the valve opening electric energy obtained by the valve opening electric energy obtaining portion corresponding to a predetermined first pressure differential generated by the pressure differential control portion and a second valve opening electric energy which is the valve opening electric energy obtained by the valve opening electric energy obtaining portion corresponding to a predetermined second pressure differential different which is different from the first pressure differential generated by the pressure differential control portion; and wherein, the valve opening electric energy obtaining portion obtains the input electric energy at the time of opening of the electromagnetic valve as the second valve opening electric energy by changing the input electric energy to the valve opening side with a first input electric energy change amount per unit of time after changing the input electric energy to the valve opening side for the electromagnetic valve with a second input electric energy change amount per unit of time to a predetermined value where the electromagnetic valve corresponding to the first valve opening electric energy is not opened upon obtaining the second valve opening electric energy of the same electromagnetic valve, after obtaining the first valve opening electric energy of the electromagnetic valve, the first input electric energy change amount per unit time being smaller than the second input electric energy change amount per unit time.

2. A vehicle braking control device adapted to a vehicle brake device having an electromagnetic valve disposed between a master cylinder and a wheel cylinder for controlling brake fluid flow therebetween in response to an input electric energy, comprising:

a pressure differential control portion for generating a predetermined pressure differential between a master cylinder side and a wheel cylinder side with respect to the electromagnetic valve;

a valve opening electric energy obtaining portion for obtaining the input electric energy upon opening of the electromagnetic valve as a valve opening electric energy, by changing the input electric energy towards an opening side of the electromagnetic valve with time, under the predetermined pressure differential being generated by the pressure differential control portion, after the input electric energy has been changed to close the electromagnetic valve;

an operation characteristic setting portion for setting an operation characteristic which is a relationship between the input electric energy to the electromagnetic valve and the predetermined pressure differential between the master cylinder side and the wheel cylinder side with respect to the electromagnetic valve based on the valve opening electric energy obtained by the valve opening electric energy obtaining portion corresponding to the predetermined pressure differential; wherein, the valve opening electric energy obtaining portion changes the input electric energy at a valve closing side or a valve opening side of the electromagnetic valve with an input electric energy change amount per unit of time at the valve closing side or the valve opening side which is larger than the input electric energy change amount per unit of time at the valve closing side or the valve opening side before the time of opening of the electromagnetic valve upon obtaining of the valve opening electric energy; and an auxiliary hydraulic pressure generating portion having an auxiliary cylinder connected to an auxiliary chamber which volume is variable in response to a displacement of a master piston of the master cylinder and an auxiliary piston slidable within the auxiliary cylinder in response to a change of volume of the auxiliary chamber thereby generating an auxiliary hydraulic pressure in the auxiliary chamber in response to a stroke position of the master piston, wherein, the valve opening electric energy obtaining portion judges that the electromagnetic valve has opened based on the auxiliary hydraulic pressure and changes the input electric energy towards the valve closing side of the electromagnetic valve in response to consecutively obtaining the valve opening electric energies of each of a plurality of the electromagnetic valves without returning the master piston to an initial position side thereof; and the operation characteristic setting portion sets the operation characteristic based on a plurality of the valve opening electric energies obtained by the valve opening electric energy obtaining portion.

3. A vehicle braking control device adapted to a vehicle brake device having an electromagnetic valve disposed between a master cylinder and a wheel cylinder for controlling brake fluid flow therebetween in response to an input electric energy, comprising:

a pressure differential control portion for generating a predetermined pressure differential between a master cylinder side and a wheel cylinder side with respect to the electromagnetic valve;

a valve opening electric energy obtaining portion for obtaining the input electric energy upon opening of the electromagnetic valve as a valve opening electric energy, by changing the input electric energy towards an opening side of the electromagnetic valve with time, under the predetermined pressure differential being generated by the pressure differential control portion, after the input electric energy has been changed to close the electromagnetic valve; and an operation characteristic setting portion for setting an operation characteristic which is a relationship between the input electric energy to the electromagnetic valve and the predetermined pressure differential between the master cylinder side and the wheel cylinder side with respect to the electromagnetic valve based on the valve opening electric energy obtained by the valve opening electric energy obtaining portion corresponding to the predetermined pressure differential; wherein, the valve opening electric energy obtaining portion changes the input electric energy at a valve closing side or a valve opening side of the electromagnetic valve with an input electric energy change amount per unit of time at the valve closing side or the valve opening side which is larger than the input electric energy change amount per unit of time at the valve closing side or the valve opening side before the time of opening of the electromagnetic valve upon obtaining of the valve opening electric energy, wherein the vehicle braking control device, adapted to the vehicle brake device having a plurality of the electromagnetic valves provided at the corresponding plurality of the wheel cylinders, further includes an auxiliary hydraulic pressure generating portion having an auxiliary cylinder connected to an auxiliary chamber which volume is variable in response to a displacement of a master piston of the master cylinder and an auxiliary piston slidable within the auxiliary cylinder in response to a change of volume of the auxiliary chamber thereby generating an auxiliary hydraulic pressure in the auxiliary chamber in response to a stroke position of the master piston, and wherein the valve opening electric energy obtaining portion judges that the electromagnetic valve has opened based on the auxiliary hydraulic pressure and, while consecutively obtaining the valve opening electric energies of each of the plurality of the electromagnetic valves without returning the master piston to an initial position side thereof, obtains, as a last of the obtained valve opening electric energies among each of the plurality of the electromagnetic valves provided at one of the plurality of wheel cylinders, the electromagnetic valve provided at the one of the plurality of wheel cylinders where a largest amount of brake fluid with respect to the hydraulic pressure applied thereto flows, upon consecutively obtaining the valve opening electric energies of each of the plurality of the electromagnetic valves without returning the master piston to an initial position side thereof.

4. A vehicle braking control device adapted to a vehicle brake device having an electromagnetic valve disposed between a master cylinder and a wheel cylinder for controlling brake fluid flow therebetween in response to an input electric energy, comprising:

a pressure differential control portion for generating a predetermined pressure differential between a master cylinder side and a wheel cylinder side with respect to the electromagnetic valve;

a valve opening electric energy obtaining portion for obtaining the input electric energy upon opening of the electromagnetic valve as a valve opening electric energy, by changing the input electric energy towards an opening side of the electromagnetic valve with time, under the predetermined pressure differential being generated by the pressure differential control portion, after the input electric energy has been changed to close the electromagnetic valve;

an operation characteristic setting portion for setting an operation characteristic which is a relationship between the input electric energy to the electromagnetic valve and the predetermined pressure differential between the master cylinder side and the wheel cylinder side with respect to the electromagnetic valve based on the valve opening electric energy obtained by the valve opening electric energy obtaining portion corresponding to the predetermined pressure differential; wherein, the valve opening electric energy obtaining portion changes the input electric energy at a valve closing side or a valve opening side of the electromagnetic valve with an input electric energy change amount per unit of time at the valve closing side or the valve opening side which is larger than the input electric energy change amount per unit of time at the valve closing side or the valve opening side before the time of opening of the electromagnetic valve upon obtaining of the valve opening electric energy; and an auxiliary hydraulic pressure generating portion having an auxiliary cylinder connected to an auxiliary chamber which volume is variable in response to a displacement of a master piston of the master cylinder and an auxiliary piston slidable within the auxiliary cylinder in response to a change of volume of the auxiliary chamber thereby generating an auxiliary hydraulic pressure in the auxiliary chamber in response to a stroke position of the master piston, wherein the operation characteristic setting portion sets the operation characteristic of the electromagnetic valve based on a first valve opening electric energy which is the valve opening electric energy obtained by the valve opening electric energy obtaining portion corresponding to a predetermined first pressure differential generated by the pressure differential control portion and a second valve opening electric energy which is the valve opening electric energy obtained by the valve opening electric energy obtaining portion corresponding to a predetermined second pressure differential which is larger than the first pressure differential generated by the pressure differential control portion and the valve opening electric energy obtaining portion judges that the electromagnetic valve has opened based on the auxiliary hydraulic pressure and obtains the second valve opening electric energy after obtaining the first valve opening electric energy upon consecutively obtaining the plurality of valve opening electric energies without returning the master piston to an initial position side.

5. A vehicle braking control device adapted to a vehicle brake device having an electromagnetic valve disposed between a master cylinder and a wheel cylinder for controlling brake fluid flow therebetween in response to an input electric energy, comprising:

a pressure differential control portion for generating a predetermined pressure differential between a master cylinder side and a wheel cylinder side with respect to the electromagnetic valve;

a valve opening electric energy obtaining portion for obtaining the input electric energy upon opening of the electromagnetic valve as a valve opening electric energy, by changing the input electric energy towards an opening side of the electromagnetic valve with time, under the predetermined pressure differential being generated by the pressure differential control portion, after the input electric energy has been changed to close the electromagnetic valve; and an operation characteristic setting portion for setting an operation characteristic which is a relationship between the input electric energy to the electromagnetic valve and the predetermined pressure differential between the master cylinder side and the wheel cylinder side with respect to the electromagnetic valve based on the valve opening electric energy obtained by the valve opening electric energy obtaining portion corresponding to the predetermined pressure differential; wherein, the valve opening electric energy obtaining portion changes the input electric energy at a valve closing side or a valve opening side of the electromagnetic valve with an input electric energy change amount per unit of time at the valve closing side or the valve opening side which is larger than the input electric energy change amount per unit of time at the valve closing side or the valve opening side before the time of opening of the electromagnetic valve upon obtaining of the valve opening electric energy, wherein the vehicle braking control device, adapted to the vehicle brake device having a plurality of the electromagnetic valves disposed at corresponding each of a plurality of the wheel cylinders, further includes an auxiliary hydraulic pressure generating portion having an auxiliary cylinder connected to an auxiliary chamber which volume is variable in response to a displacement of a master piston of the master cylinder and an auxiliary piston slidable within the auxiliary cylinder in response to a change of volume of the auxiliary chamber thereby generating an auxiliary hydraulic pressure in the auxiliary chamber in response to a stroke position of the master piston, and wherein the operation characteristic setting portion sets the operation characteristic of the electromagnetic valve based on a first valve opening electric energy which is the valve opening electric energy obtained by the valve opening electric energy obtaining portion corresponding to a predetermined first pressure differential generated by the pressure differential control portion and a second valve opening electric energy which is the valve opening electric energy obtained by the valve opening electric energy obtaining portion corresponding to a predetermined second pressure differential which is larger than the first pressure differential generated by the pressure differential control portion and the valve opening electric energy obtaining portion judges that the electromagnetic valve has opened based on the auxiliary hydraulic pressure and obtains the first and the second valve opening electric energies of the plurality of the electromagnetic valves, a first part of a valve opening electric energy consecutive obtaining process of one time is represented as the first valve opening electric energy and a second part of the same valve opening electric energy consecutive obtaining process at the one time is represented as the second valve opening electric energy upon obtaining the first and the second valve opening electric energies of the plurality of the electromagnetic valves by executing the valve opening electric energy consecutive obtaining process for a plurality of times without returning the master piston to an initial position side.

* * * * *